United States Patent
Kishikawa et al.

(10) Patent No.: US 11,128,657 B2
(45) Date of Patent: Sep. 21, 2021

(54) ELECTRONIC CONTROL DEVICE, FRAUD DETECTION SERVER, IN-VEHICLE NETWORK SYSTEM, IN-VEHICLE NETWORK MONITORING SYSTEM, AND IN-VEHICLE NETWORK MONITORING METHOD

(71) Applicant: Panasonic Intellectual Property Corporation of America, Torrance, CA (US)

(72) Inventors: Takeshi Kishikawa, Osaka (JP); Hideki Matsushima, Osaka (JP); Tomoyuki Haga, Nara (JP); Manabu Maeda, Osaka (JP); Takamitsu Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/520,782

(22) Filed: Jul. 24, 2019

(65) Prior Publication Data

US 2019/0349394 A1 Nov. 14, 2019

Related U.S. Application Data

(63) Continuation of application No. PCT/JP2018/042731, filed on Nov. 19, 2018.

(30) Foreign Application Priority Data

Dec. 1, 2017 (JP) .............................. JP2017-231495

(51) Int. Cl.
*G06F 21/00* (2013.01)
*H04L 29/06* (2006.01)
(Continued)

(52) U.S. Cl.
CPC ........ *H04L 63/1441* (2013.01); *B60R 16/023* (2013.01); *G07C 5/008* (2013.01); *H04L 63/062* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 6,198,996 B1 * | 3/2001 | Berstis | B60R 25/25 701/36 |
| 7,082,359 B2 * | 7/2006 | Breed | G07C 5/008 701/31.5 |

(Continued)

FOREIGN PATENT DOCUMENTS

| | | |
|---|---|---|
| EP | 3 113 529 | 1/2017 |
| JP | 2017-111796 | 6/2017 |
| WO | 2017/175158 | 10/2017 |

OTHER PUBLICATIONS

International Search Report (ISR) dated Feb. 12, 2019 in International (PCT) Application No. PCT/JP2018/042731.

(Continued)

*Primary Examiner* — Maung T Lwin
(74) *Attorney, Agent, or Firm* — Wenderoth, Lind & Ponack, L.L.P.

(57) ABSTRACT

A gateway that notifies a fraud detection server located outside a vehicle of information about an in-vehicle network system including an in-vehicle network includes: a priority determiner that determines a priority using at least one of: a state of the vehicle including the in-vehicle network system; an identifier of a message communicated on the in-vehicle network; and a result of fraud detection performed on the message; a frame transmitter-receiver that transmits and receives the message communicated on the in-vehicle network; a frame interpreter that extracts information about the (Continued)

| VEHICLE TYPE | VEHICLE ID | TIME OF DAY | LOCATION INFORMATION | STATE OF VEHICLE | DETECTED ABNORMALITY | PRIORITY |
|---|---|---|---|---|---|---|
| A | 1010a | 2020/5/6 13:51:30 | TOKYO | RUNNING AT HIGH SPEED | HIGH LOAD ON BUS | 3 |
| A | 1010a | 2020/5/6 13:51:20 | TOKYO | RUNNING AT HIGH SPEED | HIGH LOAD ON BUS | 2 |
| A | 1011a | 2020/5/6 13:41:18 | OSAKA | RUNNING | FALSE MESSAGE DETECTED | 2 |
| B | 1010b | 2020/5/5 9:30:10 | OSAKA | STOPPED | FALSE MESSAGE DETECTED | 1 |
| B | 1011b | 2020/5/4 9:20:20 | OSAKA | STOPPED | FALSE MESSAGE DETECTED | 1 | in-vehicle network based on the message received by the frame transmitter-receiver; and a frame uploader that notifies the fraud detection server of notification information including the priority and the information about the in-vehicle network.

16 Claims, 27 Drawing Sheets

(51) Int. Cl.
*B60R 16/023* (2006.01)
*G07C 5/00* (2006.01)

(56) References Cited

U.S. PATENT DOCUMENTS

| | | | |
|---|---|---|---|
| 9,160,557 B2* | 10/2015 | Itou | G06F 3/00 |
| 2006/0052919 A1* | 3/2006 | Hong | G07C 5/008 |
| | | | 701/31.4 |
| 2012/0153719 A1* | 6/2012 | Inaba | H03K 17/168 |
| | | | 307/10.1 |
| 2013/0219170 A1* | 8/2013 | Naitou | H04L 63/0471 |
| | | | 713/153 |
| 2014/0114502 A1* | 4/2014 | Hugron | G07C 5/008 |
| | | | 701/2 |
| 2015/0113638 A1* | 4/2015 | Valasek | G06F 21/562 |
| | | | 726/22 |
| 2015/0191136 A1* | 7/2015 | Ben Noon | B60R 25/00 |
| | | | 726/23 |
| 2015/0329078 A1* | 11/2015 | Guo | B60R 25/33 |
| | | | 701/45 |
| 2016/0294855 A1* | 10/2016 | Maeda | H04L 63/1425 |
| 2017/0349148 A1* | 12/2017 | Bojanowski | B60S 1/0862 |
| 2018/0295147 A1 | 10/2018 | Haga et al. | |

OTHER PUBLICATIONS

Extended European Search Report dated Dec. 4, 2020 in corresponding European Patent Application No. 18883567.2.

* cited by examiner

FIG. 4

| VEHICLE TYPE | ECU ID | CAN ID | BUS | MAC |
|---|---|---|---|---|
| A | 001 | 0x100 | 10 | INCLUDED |
| | | 0x101 | 20 | INCLUDED |
| | 002 | 0x200 | 10 | NOT INCLUDED |
| B | 001 | 0x110 | 10 | INCLUDED |
| | | 0x111 | 20 | INCLUDED |
| | 003 | 0x301 | 30 | INCLUDED |
| C | 004 | 0x400 | 10 | NOT INCLUDED |
| | 005 | 0x500 | 10 | NOT INCLUDED |

FIG. 6

| VEHICLE TYPE | VEHICLE ID | TIME OF DAY | LOCATION INFORMATION | STATE OF VEHICLE | DETECTED ABNORMALITY | PRIORITY |
|---|---|---|---|---|---|---|
| A | 1010a | 2020/5/6 13:51:30 | TOKYO | RUNNING AT HIGH SPEED | HIGH LOAD ON BUS | 3 |
| A | 1010a | 2020/5/6 13:51:20 | TOKYO | RUNNING AT HIGH SPEED | HIGH LOAD ON BUS | 2 |
| A | 1011a | 2020/5/6 13:41:18 | OSAKA | RUNNING | FALSE MESSAGE DETECTED | 2 |
| B | 1010b | 2020/5/5 9:30:10 | OSAKA | STOPPED | FALSE MESSAGE DETECTED | 1 |
| B | 1011b | 2020/5/4 9:20:20 | OSAKA | STOPPED | FALSE MESSAGE DETECTED | 1 |

FIG. 7

| VEHICLE TYPE | DISABLING OF DRIVER ASSISTANCE FUNCTION | REMOTE CONTROL | FIRMWARE UPDATING |
|---|---|---|---|
| A | AVAILABLE | UNAVAILABLE | AVAILABLE |
| B | AVAILABLE | AVAILABLE | AVAILABLE |
| C | UNAVAILABLE | UNAVAILABLE | AVAILABLE |
| D | AVAILABLE | UNAVAILABLE | AVAILABLE |

FIG. 9

| CONDITIONS | PRIORITY |
|---|---|
| SPEED > 0 km/h (RUNNING) | +1 |
| SPEED > 0 km/h (RUNNING AT HIGH SPEED) | +1 |
| DIAGNOSTIC FRAME, FIRMWARE UPDATE FRAME, DRIVER ASSISTANCE FRAME | +1 |
| ABSOLUTE VALUE OF ACCELERATION > 0.4 G | +1 |
| FRAME RECEPTION COUNTER > 1000 (HIGH LOAD ON BUS) | +2 |
| MAC VERIFICATION FAILED | +3 |

FIG. 15

| NO. | RULE TYPE | BUS | CAN ID | RULE |
|---|---|---|---|---|
| 1 | CYCLE | 10 | 0x100 | 9 - 11 (ms) |
| 2 | CYCLE | 20 | 0x200 | 18 - 22 (ms) |
| 3 | CYCLE | 30 | 0x300 | 36 - 44 (ms) |
| 4 | DATA | 10 | 0x100 | 0TH BYTE: 0x00 |

FIG. 17

| CONDITIONS | PRIORITY |
|---|---|
| PERIODIC COMMUNICATION FRAME | 0 |
| FRAUD NOTIFICATION FRAME RECEIVED & FRAUD FRAME UNRELATED TO VEHICLE CONTROL | 1 |
| FRAUD NOTIFICATION FRAME RECEIVED & FRAUD FRAME RELATED TO VEHICLE CONTROL & VEHICLE CURRENTLY STOPPED | 2 |
| FRAUD NOTIFICATION FRAME RECEIVED & FRAUD FRAME RELATED TO VEHICLE CONTROL & VEHICLE CURRENTLY RUNNING | 3 |

FIG. 18

| TIME OF DAY (SECONDS) | FRAME TYPE | FRAUD TYPE | PRIORITY | NOTIFICATION TO SERVER |
|---|---|---|---|---|
| 341.000 | PERIODIC (SPEED, STEERING ANGLE, HYDRAULIC PRESSURE OF BRAKE, ETC.) | INAPPLICABLE | 0 | 1 |
| 340.330 | SHIFT POSITION | CYCLE | 2 | 0 |
| 340.230 | SHIFT POSITION | CYCLE | 2 | 1 |
| 340.000 | PERIODIC (SPEED, STEERING ANGLE, HYDRAULIC PRESSURE OF BRAKE, ETC.) | INAPPLICABLE | 0 | 1 |
| ... | | | | |

ELECTRONIC CONTROL DEVICE, FRAUD
DETECTION SERVER, IN-VEHICLE
NETWORK SYSTEM, IN-VEHICLE
NETWORK MONITORING SYSTEM, AND
IN-VEHICLE NETWORK MONITORING
METHOD

CROSS REFERENCE TO RELATED
APPLICATIONS

This application is a U.S. continuation application of PCT International Patent Application Number PCT/JP2018/042731 filed on Nov. 19, 2018, claiming the benefit of priority of Japanese Patent Application Number 2017-231495 filed on Dec. 1, 2017, the entire contents of which are hereby incorporated by reference.

BACKGROUND

1. Technical Field

The present disclosure relates to an electronic control device, a fraud detection server, an in-vehicle network system, an in-vehicle network monitoring system, and an in-vehicle network monitoring method.

2. Description of the Related Art

In recent years, a system provided inside a vehicle includes multiple devices called "electronic control units (hereinafter, referred to as ECUs". A network connecting these ECUs is called an "in-vehicle network". A number of standards have been developed for in-vehicle networks. One of the most leading in-vehicle networks is a controller area network (hereinafter, also referred to as a CAN).

The CAN has no security function intended to protect the system against fraudulent frame transmission. Unfortunately, this allows a fraudulent node to make an unauthorized connection to a bus of the CAN for the fraudulent frame transmission to fraudulently control the vehicle.

Japanese Unexamined Patent Application Publication No. 2017-111796 discloses a method of uploading information about a frame transmitted to an in-vehicle network to a fraud detection server to calculate an abnormality level of this frame transmitted to the in-vehicle network.

SUMMARY

However, the method disclosed in Japanese Unexamined Patent Application Publication No. 2017-111796 increases network communication traffic or a processing load of the fraud detection server when information about the in-vehicle networks is uploaded from a number of vehicles. Such an increase in the processing load of the fraud detection server is undesirable in terms of power usage and possibility of causing a delay in detecting a fraudulent event.

In view of this, the present disclosure provides, for example, an electronic control device that suppresses an increase in a processing load of a fraud detection server even when information about in-vehicle networks is uploaded to the fraud detection server from a number of vehicles.

An electronic control device according to an aspect of the present disclosure is an electronic control device that notifies a fraud detection server located outside a vehicle of information about an in-vehicle network system including an in-vehicle network, the electronic control device including: a priority determiner that determines a priority using at least one of: a state of the vehicle including the in-vehicle network system; an identifier of a message communicated on the in-vehicle network; and a result of fraud detection performed on the message; a first communicator that transmits and receives the message communicated on the in-vehicle network; a vehicle log extractor that extracts information about the in-vehicle network based on the message received by the first communicator; and a second communicator that notifies the fraud detection server of notification information including the priority and the information about the in-vehicle network.

Note that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

An electronic control device according to the present disclosure is capable of suppressing an increase in a processing load of a fraud detection server even when information about in-vehicle networks is uploaded to the fraud detection server from a number of vehicles.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 4 illustrates an example of vehicle information stored in a vehicle information database (DB) according to Embodiment 1;

FIG. 6 illustrates an example of analytical results stored in an analytical result storage DB according to Embodiment 1;

FIG. 7 illustrates an example of security information stored in a security information DB according to Embodiment 1;

FIG. 9 illustrates an example of a priority rule of a rule holder according to Embodiment 1;

FIG. 15 illustrates an example of priority rules stored in a fraud detection rule holder according to Embodiment 2;

FIG. 17 illustrates an example of priority rules stored in a priority rule holder according to Embodiment 2;

FIG. 18 illustrates an example of a frame reception history stored in a frame reception history holder according to Embodiment 2;

DETAILED DESCRIPTION OF THE EMBODIMENTS

Figure 1:
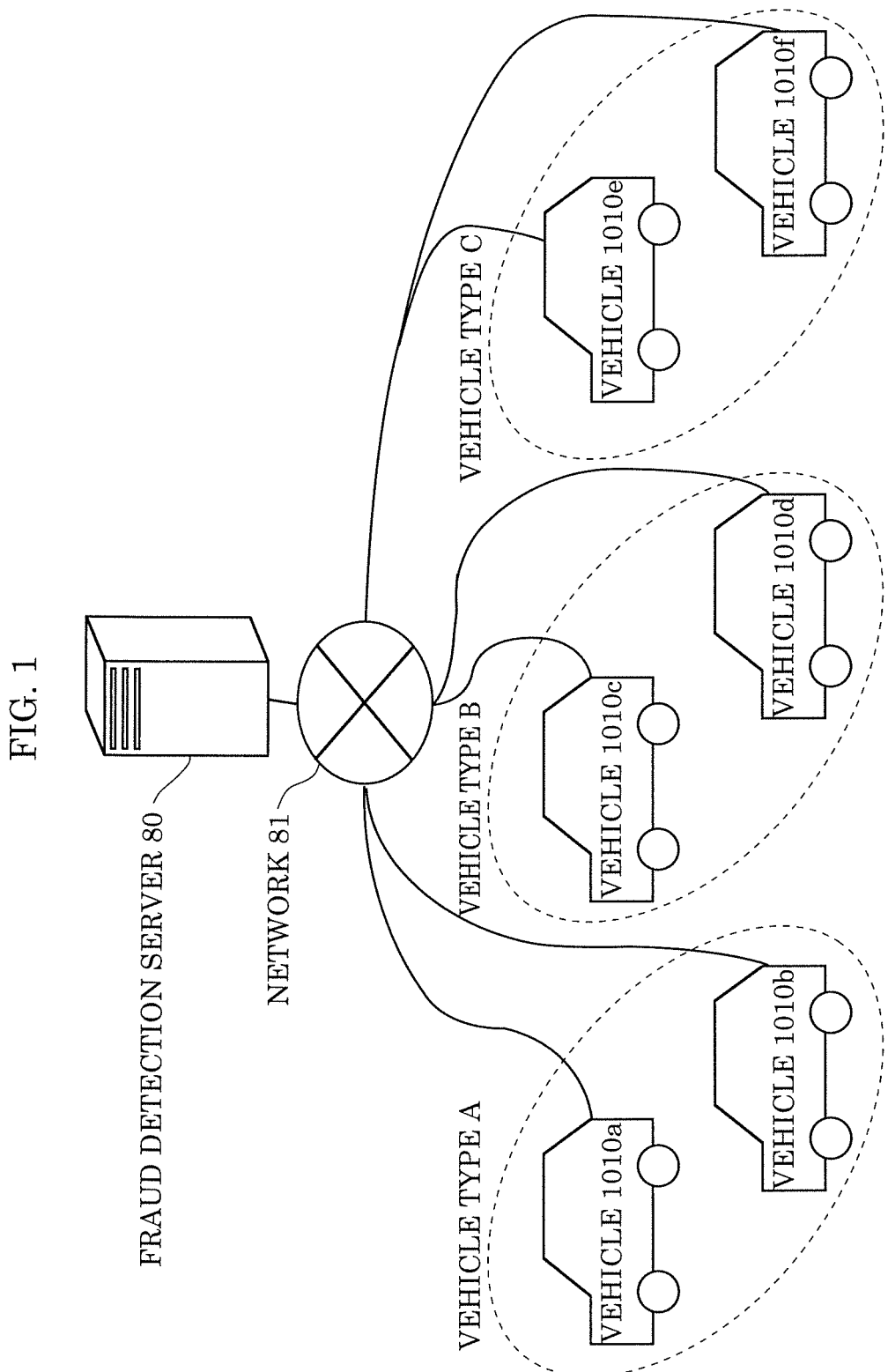
FIG. 1 illustrates an overall configuration of an in-vehicle network monitoring system according to Embodiment 1.

An electronic control device according to an aspect of the present disclosure is an electronic control device that notifies a fraud detection server located outside a vehicle of information about an in-vehicle network system including an in-vehicle network. The electronic control device includes: a priority determiner that determines a priority using at least one of: a state of the vehicle including the in-vehicle network system; an identifier of a message communicated on the in-vehicle network; and a result of fraud detection performed on the message; a first communicator that transmits and receives the message communicated on the in-vehicle network; a vehicle log extractor that extracts information about the in-vehicle network based on the message received by the first communicator; and a second communicator that notifies the fraud detection server of notification information including the priority and the information about the in-vehicle network.

Thus, the electronic control device uploads the information about the in-vehicle network system together with the priority to the fraud detection server located outside the vehicle. This allows the fraud detection server to obtain the priority of the notification information appropriate to the internal state of the vehicle, and to perform, for example, the analytical processing according to the priority. This is effective in determination about computational resources to be allocated for the analysis, efficient analysis, and immediate handling of the notification information having a higher priority.

To be more specific, the information notified from the in-vehicle network includes the information indicating the priority. On this account, even when the information about the in-vehicle networks received by the fraud detection device in the in-vehicle network system increases, the fraud detection device can process the received information according to the information indicating the priority. This reduces the processing load of the fraud detection device and allows the immediate detection of a fraudulent event. Thus, even when the information about the in-vehicle networks is uploaded to the fraud detection server from a number of vehicles, an increase in the processing load of the fraud detection server can be suppressed.

For example, the state of the vehicle may be information calculated based on the message received by the first communicator and includes at least one of a speed of the vehicle; acceleration of the vehicle; a steering angle of the vehicle; an operating condition of a driver assistance function of the vehicle; and a bandwidth occupancy rate of the in-vehicle network.

With this, the priority reflecting the running state of the vehicle or the relatively-high risk state is transmitted to the fraud detection server. Thus, when a higher-risk state is detected, a higher priority is determined for the processing to be performed by the fraud detection server. This leads to enhancement of the security.

For example, the priority determiner may determine the priority to be higher when a type of the message determined by the identifier of the message indicates one of: a control message related to the driver assistance function or a self-driving function; a message related to firmware-updating of the electronic control device included in the vehicle; a message related to a notification about a running state of the vehicle; and a diagnostic message of the vehicle.

With this, the priority reflecting the information indicating that the message more significantly affects the vehicle control is transmitted to the fraud detection server. Thus, when a higher-risk message is received, a higher priority is determined for the processing to be performed by the fraud detection server. This leads to enhancement of the security.

For example, the result of the fraud detection may include a result of verification performed on a message authentication code included in the message communicated on the in-vehicle network, and the priority determiner may determine the priority to be higher when the result of the verification performed on the message authentication code is negative.

With this, the priority reflecting the fraud occurring inside the vehicle is transmitted to the fraud detection server. Thus, when a higher-risk fraud is detected, a higher priority is determined for the processing to be performed by the fraud detection server. This leads to enhancement of the security.

For example, the electronic control device may further include a fraud detector that detects fraud in the message communicated on the in-vehicle network. The result of the fraud detection performed on the message may be information indicating whether the fraud detector detects the fraud in the message, and the priority determiner may determine the priority to be higher when the result of the fraud detection indicates the fraud is detected in the message.

With this, the priority reflecting the fraud occurring inside the vehicle is transmitted to the fraud detection server. Thus, when a higher-risk fraudulent message is received, a higher priority is determined for the processing to be performed by the fraud detection server. This leads to enhancement of the security.

For example, the notification information may include the identifier of the message related to the information about the in-vehicle network that is included in the notification information, and the second communicator may hold past notification information previously transmitted to the fraud detection server, and before transmitting new notification information to the fraud detection server, disable transmission of the new notification information to the fraud detection server when the past notification information matches with a predetermined part of: the identifier of the message related to the information about the in-vehicle network that is included in the new notification information; the result of the fraud detection performed on the message included in the new notification information; and the priority included in the new notification information.

This allows the fraud detection server not to notified repeatedly about the same type of notification information. This is consequently effective in reducing the communication band of the network and the processing load of the server.

For example, when the priority is a first predetermined value or lower, the second communicator may perform one of; a process of disabling transmission of the notification information to the fraud detection server; and a process of transmitting the notification information to the fraud detection server at a first timing having predetermined communication intervals, and when the priority is a second predetermined value or higher, the second communicator may transmit the notification information to the fraud detection server at a second timing different from the first timing.

Thus, the fraud detection server is immediately notified of the notification information having a relatively high priority. This promises to be effective in the immediate analysis and handling when a high-risk state is detected.

Furthermore, a fraud detection server according to an aspect of the present disclosure is a fraud detection server that receives notification information including information about an in-vehicle network system including an in-vehicle network from at least one vehicle. The fraud detection server includes: a third communicator that receives notification information including a priority and the information about the in-vehicle network system from the at least one vehicle; and a log analyzer that analyzes whether fraud occurs to the in-vehicle network system, based on the information about the in-vehicle network system. When the priority included in the notification information is higher, the log analyzer more preferentially analyzes the information about the in-vehicle network system included in the notification information.

This allows the fraud detection server to obtain the priority of the notification information appropriate to the internal state of the vehicle, and to perform, for example, the analytical processing according to the priority. This is effective in determination about computational resources to be allocated for the analysis, efficient analysis, and immediate handling of the notification information having a higher priority.

For example, when the priority included in the notification information is higher, the log analyzer may: bring forward analysis of information about the in-vehicle network; allocate more computational resources for the analysis of the information about the in-vehicle network; or determine that the analysis of the information about the in-vehicle network is to be performed more preferentially when determining whether the analysis is to be performed.

Thus, to control the analytical processing, the fraud detection server determines the following, more specifically according to the priority level: an ordinal rank of the information about the in-vehicle network that is to be analyzed; the amount of computational resources to be allocated for this analysis; and whether this analysis is to be performed.

For example, the fraud detection server may further include a handler that handles fraud occurring to the in-vehicle network. When the priority is a first predetermined value or lower, the log analyzer may disable the analysis of the information about the in-vehicle network, and when the priority is a second predetermined value or higher, the handler may handle the fraud occurring to the in-vehicle network.

This enables the processes, such as the analysis according to the priority, to be performed using the predetermined thresholds. This is effective in determination about computational resources to be allocated for the analysis, efficient analysis, and immediate handling of the notification information having a higher priority.

For example, to handle the fraud occurring to the in-vehicle network of a vehicle among the at least one vehicle, the handler may perform at least one of: (a) notifying a manager present outside the fraud detection server about occurrence of the fraud; (b) transmitting, to the vehicle, a control signal to disable a driver assistance function and a self-driving function; (c) updating encryption key information included in the vehicle; (d) notifying the vehicle about a shift to a functional safety mode; (e) notifying the vehicle about a shift to a remote control mode; (f) making a voice call to an operator present outside the vehicle; (g) forcefully terminating an information-related system included in the vehicle; and (h) updating firmware of an electronic control device included in the vehicle.

This is effective in facilitating specific handling for safe vehicle control based on the analytical results given by the fraud detection server.

For example, the fraud detection server may further include a setting determiner that sets a lower limit of the priority of the notification information transmitted from the at least one vehicle to the fraud detection server. The setting determiner may measure a processing load of the fraud detection server, and when the processing load of the fraud detection server that is measured is a predetermined value or higher, the setting determiner may raise the lower limit of the priority and notifies the at least one vehicle of the raised lower limit.

Thus, the information to be notified by the vehicle can be restricted depending on to the processing load of the server. This is effective in terms of reducing the communication traffic and stabilizing the processing load of the server.

Furthermore, an in-vehicle network system according to an aspect of the present disclosure is an in-vehicle network system that notifies a fraud detection server located outside a vehicle of notification information including information about the in-vehicle network system including an in-vehicle network. The in-vehicle network system includes: a first electronic control device; and a second electronic control device. The first electronic control device includes: a fraud detector that detects fraud in a message communicated on the in-vehicle network; and a fraud notifier that notifies the second electronic control device of a result of fraud detection performed on the message by the fraud detector. The second electronic control device includes: a second priority determiner that determines a priority using at least one of: a state of the vehicle including the in-vehicle network system; an identifier of the message communicated on the in-vehicle network; and the result of the fraud detection performed on the message; a fourth communicator that transmits and receives the message communicated on the in-vehicle network; a second vehicle log extractor that extracts information about the in-vehicle network based on the message received by the fourth communicator; a second fraud detection result receiver that receives the result of the fraud detection performed on the message from the first electronic control device; and a fifth communicator that notifies the fraud detection server of notification information including the priority and the information about the in-vehicle network.

Thus, based on the priority and the information notified using the first and second electronic control devices, the fraud detection server can obtain the priority of the notification information appropriate to the internal state of the vehicle, and can perform, for example, the analytical processing according to the priority. This is effective in determination about computational resources to be allocated for the analysis, efficient analysis, and immediate handling of the notification information having a higher priority.

For example, the in-vehicle network system may further include a third electronic control device. The third electronic control device may include: a third priority determiner that determines the priority using at least one of: the state of the vehicle including the in-vehicle network system; the identifier of the message communicated on the in-vehicle network; and the result of the fraud detection performed on the message; a sixth communicator that transmits and receives the message communicated on the in-vehicle network; a third vehicle log extractor that extracts the information about the in-vehicle network based on the message received by the sixth communicator; a third fraud detection result receiver that receives the result of the fraud detection performed on the message from the first electronic control device; and a seventh communicator that notifies the fraud detection server of the notification information including the priority and the information about the in-vehicle network. The fraud notifier notifies the third electronic control device of the result of the fraud detection when an identifier of a detected fraudulent message is the identifier of the message transmitted from the first electronic control device.

Thus, the fraud detection server can be notified of the information about the in-vehicle network without involving a possibly fraudulent electronic control device located inside the vehicle. This is effective in enhancing the security.

Furthermore, an in-vehicle network monitoring system according to an aspect of the present disclosure is an in-vehicle network monitoring system that monitors an in-vehicle network included in a vehicle. The in-vehicle network monitoring system includes: an electronic control device that notifies a fraud detection server located outside the vehicle of information about an in-vehicle network system including the in-vehicle network; and the fraud detection server. The electronic control device includes: a priority determiner that determines a priority using at least one of: a state of the vehicle including the in-vehicle network system; an identifier of a message communicated on the in-vehicle network; and a result of fraud detection performed on the message; a first communicator that transmits and receives the message communicated on the in-vehicle network; a vehicle log extractor that extracts information about the in-vehicle network based on the message received by the first communicator; and a second communicator that notifies the fraud detection server of notification information including the priority and the information about the in-vehicle network. The fraud detection server includes: a third communicator that receives notification information including the priority and the information about the in-vehicle network system from at least one vehicle; and a log analyzer that analyzes whether fraud occurs to the in-vehicle network system, based on the information about the in-vehicle network system. When the priority included in the notification information is higher, the log analyzer more preferentially analyzes the information about the in-vehicle network system included in the notification information.

Accordingly, the in-vehicle network monitoring system produces the same advantageous effects as the above-described electronic control device and fraud detection server.

Furthermore, an in-vehicle network monitoring method according to an aspect of the present disclosure is an in-vehicle network monitoring method of monitoring an in-vehicle network included in a vehicle. The in-vehicle network monitoring method includes: determining a priority using at least one of: a state of the vehicle including an in-vehicle network system; an identifier of a message communicated on the in-vehicle network; and a result of fraud detection performed on the message; transmitting and receiving the message communicated on the in-vehicle network; extracting information about the in-vehicle network based on the message received in the transmitting and receiving; notifying notification information including the priority and the information about the in-vehicle network; receiving notification information including the priority and information about the in-vehicle network system from at least one vehicle; and analyzing whether fraud occurs to the in-vehicle network system, based on the information about the in-vehicle network system. When the priority included in the notification information is higher, the information about the in-vehicle network system included in the notification information is more preferentially analyzed in the analyzing.

Accordingly, the in-vehicle network monitoring method produces the same advantageous effects as the above-described electronic control device and fraud detection server.

Note that these generic or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be described in detail with reference to the drawings.

Note that each of the subsequently described embodiments shows a generic or specific example. The numerical values, shapes, materials, structural components, the arrangement and connection of the structural components, steps, the processing order of the steps, etc. shown in the following embodiments are mere examples, and thus are not intended to limit the present disclosure. Furthermore, among the structural components described in the following embodiments, those structural components not recited in any one of the independent claims that indicate the broadest concepts are described as optional structural components.

Embodiment 1

The following describes an in-vehicle network monitoring system that includes a server (also referred to as a fraud detection server) and a plurality of vehicles each of which has an in-vehicle network (an in-vehicle network system) allowing a plurality of electronic control units (also referred to as electronic control devices or ECUs) to communicate with each other via CAN buses. Moreover, the following also describes an information notification method for notifying the fraud detection server of information about the in-vehicle network system.

By this information notification method, the electronic control device notifies the fraud detection server of information indicating a priority of processing performed by the fraud detection server together with information about a frame transmitted through the in-vehicle network system.

Even when notified of a large number of frames present in the in-vehicle network system, the fraud detection server is capable of performing a fraud detection process in order of priority. This is useful to achieve immediate detection of fraud and reduce a processing load of the server.

1.1 Overall Configuration of In-Vehicle Network Monitoring System

FIG. 1 illustrates an overall configuration of the in-vehicle network monitoring system according to the present embodiment. The in-vehicle network monitoring system includes fraud detection server 80 and vehicles 1010a, 1010b, 1010c, 1010d, 1010e, and 1010f that are connected via a channel, network 81.

Network 81 may include the Internet or a dedicated line. Each of vehicles 1010a, 1010b, 1010c, 1010d, 1010e, and 1010f is connected to various devices located inside the vehicle, such as a control device, a sensor, an actuator, and a user interface device. Each of vehicles 1010a, 1010b, 1010c, 1010d, 1010e, and 1010f includes an in-vehicle network having a plurality of ECUs communicating with each other via in-vehicle buses (CAN buses).

Each of the ECUs of the in-vehicle network establishes communication under a CAN protocol. The CAN protocol supports a data frame, a remote frame, an overload frame, and an error frame. In the present embodiment, the data frame is mainly described. A CAN data frame is defined to have an ID field storing an ID, a data length code (DLC) indicating a data length, and a data field storing data.

Vehicles 1010a and 1010b belong to vehicle type A. Vehicles 1010c and 1010d belong to vehicle type B. Vehicles 1010e and 1010f belong to vehicle type C.

Here, the in-vehicle networks of the vehicles belonging to the same vehicle type have the same configuration. To be more specific, the vehicles belonging to the same vehicle type refer to, for example, the vehicles of the same model (vehicle model) that have vehicle IDs partially identical as identification information of the vehicles. A plurality of vehicles belonging to the same vehicle type share the same use specifications (such as requirements on contents of a data field for each message ID) of a data frame (a message) transmitted on the CAN buses of the in-vehicle network.

Moreover, vehicles of different types may have the ECUs of the same kind. The ECUs of the same kind have the same configuration and are, for example, the same model made by the same manufacturer. Additionally, such ECUs may have the same configuration for achieving main functions.

For the vehicles belonging to the different types but having the ECUs of the same kind, IDs of frames transmitted by the ECUs of these vehicles may be different.

1.2 Configuration of in-Vehicle Network System

Figure 2:
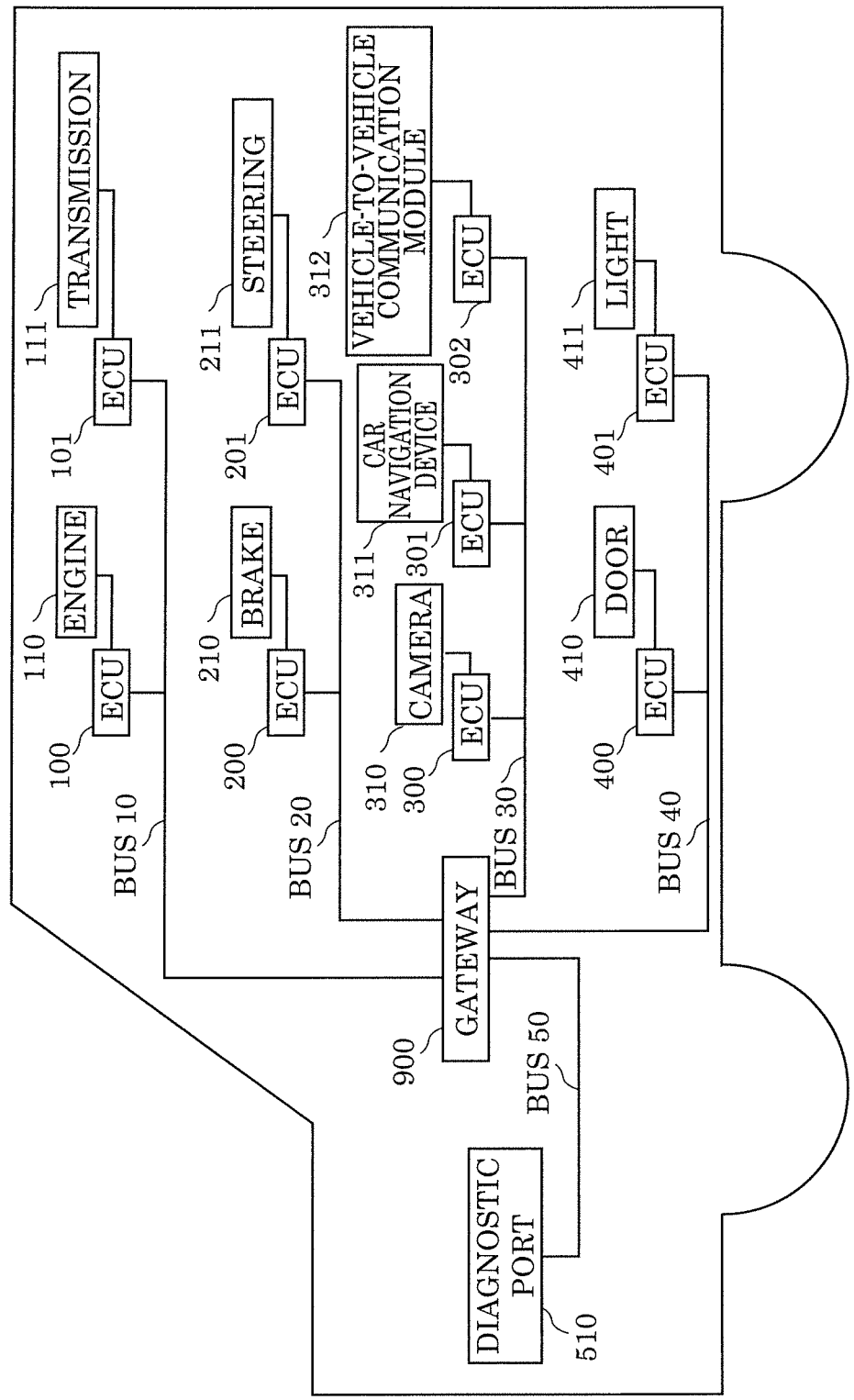
FIG. 2 illustrates an overall configuration of an in-vehicle network system according to Embodiment 1.

FIG. 2 illustrates an example of a configuration of the in-vehicle network system provided for vehicle 1010a (as well as vehicle 1010b) of vehicle type A. The vehicles of the other vehicle types have configurations that are either similar to or partially different from the configuration illustrated in FIG. 2, for example.

The in-vehicle network system provided for, for example, vehicle 1010a includes nodes, such as a plurality of ECUs (ECUs 100, 101, 200, 201, 300, 301, 302, 400, and 401) and gateway 900, that are connected by buses (CAN buses) 10, 20, 30, 40, and 50. Note that gateway 900 is also an ECU.

Although not illustrated in FIG. 2, the in-vehicle network system may further include multiple ECUs.

The ECU is a device that includes a processor (a microprocessor), a digital circuit like a memory, an analog circuit, and a communication circuit, for example. The memory is a ROM and a RAM, and is capable of storing a control program (a computer program) to be executed by the processor. For example, the processor operates according to the control program, so that the ECU achieves various functions. The computer program includes a plurality of instruction codes indicating instructions to be given to the processor to achieve a specific function.

Bus 10 is connected to powertrain-related ECUs including ECU 100 (for an engine) and ECU 101 (for a transmission) connected to engine 110 and transmission 111, respectively. These ECUs relate to "running" of the vehicle, or more specifically, relate to control over a motor, fuel, and a battery.

Bus 20 is connected to chassis-related ECUs including ECU 200 (for a brake) and ECU 201 (for steering) connected to brake 210 and steering 211, respectively. These ECUs relate to control over vehicle behavior, such as "turning" and "stopping".

Bus 30 is connected to information-related ECUs including ECU 300, ECU 301, and ECU 302 connected to camera 310, car navigation device (also known as "car-navi") 311, and a vehicle-to-vehicle communication module 312, respectively. These ECUs relate to: functions of recognizing, determining, and controlling a driver assistance function based on camera information; functions associated with an audio head unit; and vehicle-to-vehicle communications.

Bus 40 is connected to body-related ECUs including ECU 400 and ECU 401 connected to door 410 and light 411, respectively. These ECUs relate to control over vehicle equipment, such as an air conditioner and a direction indicator.

Bus 50 is connected to diagnostic port 510 that is an interface for communicating with, for example, an external diagnostic tool (a failure diagnostic tool), such as on-board diagnostics second generation (OBD2).

Each of ECUs (such as ECU 100 and ECU 200) obtains a state of the device (such as engine 110 and brake 210) connected to the ECU. The ECU periodically transmits, for example, a frame indicating this state to the in-vehicle network, or more specifically, to the CAN bus.

ECUs 100 and 101 are connected to bus 10. ECUs 200 and 201 are connected to bus 20. ECUs 300, 301, and 302 are connected to bus 30. Each of these ECUs has a function of processing a message authentication code (MAC). Such an ECU is referred to as a MAC-ready ECU. To be more specific, the MAC processing function includes functions of generating and verifying a MAC.

Each of ECUs 400 and 401 connected to bus 40 does not have the MAC processing function and thus is a non-MAC-ready ECU.

Gateway 900 is a MAC-ready ECU having the functions of generating and verifying a MAC.

Gateway 900 is an ECU that connects different channels to transfer data among the channels. Gateway 900 is connected to bus 10, bus 20, bus 30, bus 40, and bus 50. Thus, gateway 900 is one kind of ECU having a function of transferring a frame (a data frame) received from one of the buses connected to gateway 900 to another bus under a certain condition (that is, a destination bus selected according to the condition).

Gateway 900 includes a communication device (such as a communication circuit) to communicate with fraud detection server 80 located outside the vehicle. Moreover, gateway 900 has a function of transmitting (uploading) information about the frame received from the bus to fraud detection server 80, for example. The configuration of gateway 900 is described in detail later.

1.3 Configuration of Fraud Detection Server

Figure 3:
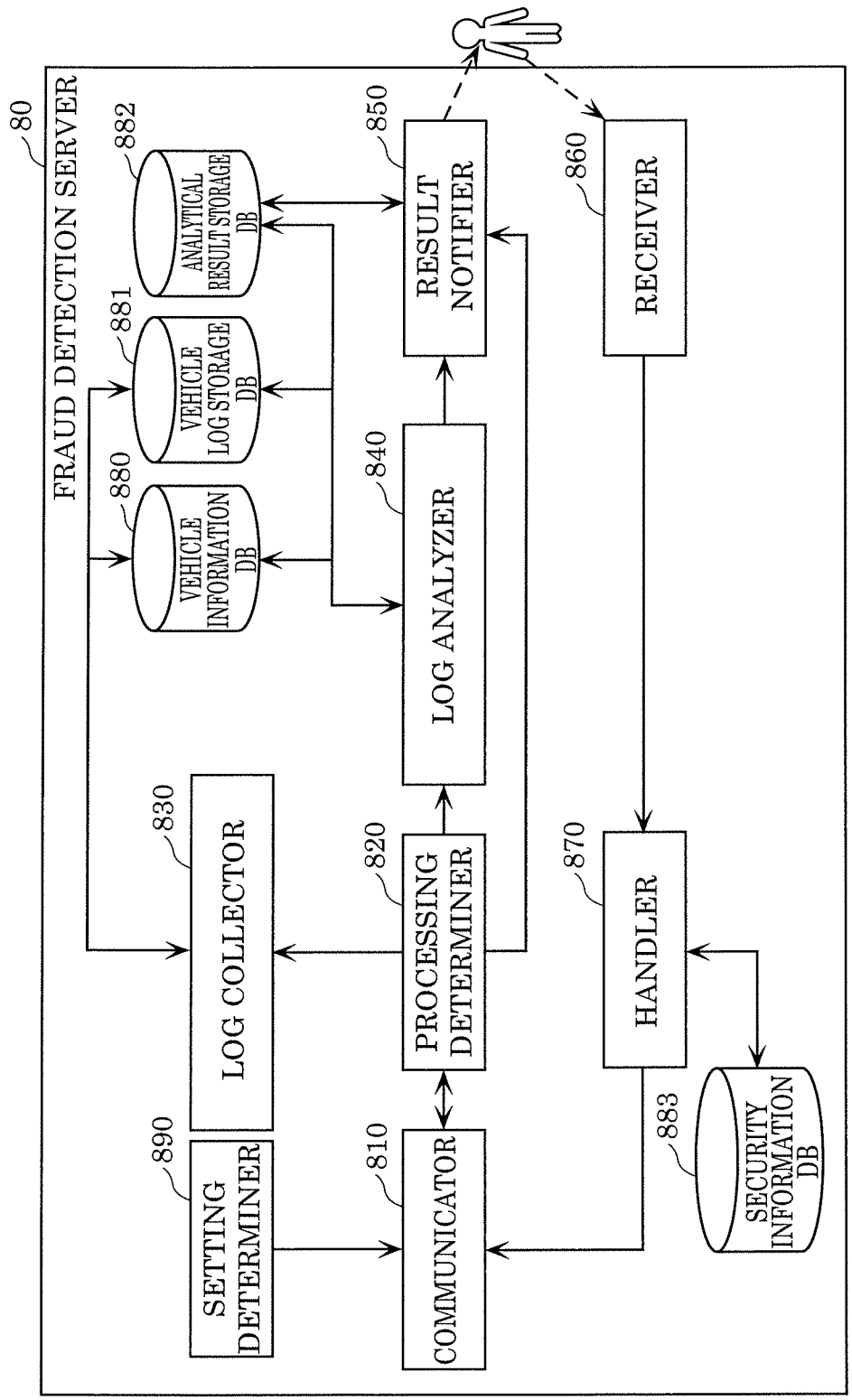
FIG. 3 illustrates a configuration of a fraud detection server according to Embodiment 1.

FIG. 3 illustrates a configuration of fraud detection server 80. Fraud detection server 80 handles a fraudulent frame transmitted on the in-vehicle network of vehicle 1010a, for example. Fraud detection server 80 is implemented by a computer that includes a processor, a memory, and a communication interface, for example. Fraud detection server 80 includes communicator 810, processing determiner 820, log collector 830, log analyzer 840, result notifier 850, receiver 860, handler 870, vehicle information DB 880, vehicle log storage DB 881, analytical result storage DB 882, security information DB 883, and setting determiner 890.

Each of vehicle information DB 880, vehicle log storage DB 881, analytical result storage DB 882, and security information DB 883 may be implemented by, for example, a recording medium, such as a memory or a hard disk.

Functions of processing determiner 820, log analyzer 840, log collector 830, handler 870, and setting determiner 890 may be implemented by a processor executing control programs stored in, for example, a memory.

Communicator 810 is implemented by, for example, a communication interface and a processor executing a control program stored in the memory. Communicator 810 corresponds to a third communicator.

Communicator 810 communicates with vehicles 1010a, 1010b, 1010c, 1010d, 1010e, and 1010f via the network to receive information about the in-vehicle networks. The information about the in-vehicle network includes, for example: contents of a frame transmitted on the CAN bus of the in-vehicle network; a timing of receiving the frame (a time interval between frame receptions or a frequency of frame reception, for instance); a bus load factor; and a result of MAC verification performed on the frame.

In addition to the information about the in-vehicle network, meta-information indicating, for example, a current state of the vehicle is also transmitted. The meta-information may include a current location of the vehicle, a basic safety message (BSM), a weather condition, and a processing priority of the information about the in-vehicle network. The location of the vehicle refers to a global positioning system (GPS) location obtained by the GPS.

Moreover, communicator 810 transmits security information to the vehicle. The security information is notified by handler 870 and used for dealing with a vehicle security incident. Examples of the security information include; presentation information for giving an alert notice to a target, such as a passenger of the vehicle; control information indicating an instruction to control running of the vehicle, for example; control information indicating an instruction to update an encryption key used for applying an encryption process to the vehicle; fraud detection information for detecting, on the vehicle side, fraud associated with a frame; information for disabling a self-driving system or a driver assistance system; information for disabling a function of the audio head unit or an external communication module; and control information for shifting the vehicle to a fail-safe mode.

Processing determiner 820 determines processing details to be performed in response to the information about the in-vehicle network that is notified by communicator 810. Here, the processing details are determined on the basis of the meta-information.

When the priority included in the meta-information is relatively low, for example, processing determiner 820 notifies log collector 803 of the notification information so that the notification information is stored into vehicle log storage DB 881. Here, the relatively low priority is a predetermined threshold or lower, or is a predetermined value indicating that the priority is relatively low. To be more specific, the predetermined value is 0 when the priority is represented by an integer from 0 to 5.

When the priority is medium, processing determiner 820 notifies log collector 803 of the notification information and also instructs log analyzer 840 to analyze the notified log. Here, the medium priority is within a range between a relatively low level and a relatively high level, or is a predetermined value indicating that the priority is medium. To be more specific, the predetermined value is 1, 2, or 3 when the priority is represented by an integer from 0 to 5.

When the priority is relatively high, processing determiner 820 notifies log collector 803 of the notification information and also instructs log analyzer 840 to analyze the notified log. Additionally, processing determiner 820 preferentially allocates a memory or a CPU resource for the analytical processing. Here, the relatively high priority is a predetermined threshold or higher, or is a predetermined value indicating that the priority is relatively high. To be more specific, the predetermined value is 4 or 5 when the priority is represented by an integer from 0 to 5.

When the priority is highest, processing determiner 820 notifies log collector 803 of the notification information and also instructs log analyzer 840 to analyze the notified log. Additionally, processing determiner 820 notifies result notifier 850 of the information so as to notify, about a fraudulent event, a manager of the in-vehicle network monitoring system or a security analyst of a security operation center. Here, the highest priority is represented by a possible highest value. For example, this value is 5 when the priority is represented by an integer from 0 to 5.

Log collector 830 stores various kinds of data, which represents the details of the log information collected from the vehicle (for example, the information about the frame received on the in-vehicle network), into vehicle log storage DB 881 on the basis of the information stored in vehicle information DB 880.

When storing the various kinds of data into vehicle log storage DB 881, log collector 830 may perform a process, such as a predetermined normalization process, on the various kinds of data.

The data stored in vehicle information DB 880 is described later, with reference to FIG. 4. The data (the vehicle log information) stored in vehicle log storage DB 881 is described later, with reference to FIG. 5.

Log analyzer 840 analyzes whether fraud occurs to the in-vehicle network system, on the basis of the information about the in-vehicle network system. When the priority included in the notification information is higher, log analyzer 840 more preferentially analyzes the information about the in-vehicle network system included in the notification information. When the priority is a first predetermined value or lower, log analyzer 840 may disable the analysis of the information about the in-vehicle network. The first predetermined value is zero, for example.

More specifically, log analyzer 840 performs the analysis using the log information collected from the vehicles stored in vehicle log storage DB 881. With this, log analyzer 840 has a function of determining whether a frame received on the in-vehicle network of one of the vehicles is fraudulent, that is, whether an attach frame is transmitted to this in-vehicle network by an attacker.

Log analyzer 840 may perform, for example, a statistical process on information about a plurality of frames collected from the vehicles that is indicated by accumulated log information. To be more specific, log analyzer 840 may perform such a process on contents and information about reception timing, for example, for each of the plurality of frames.

On the basis of the information about the plurality of frames obtained by communicator 810 and about the frame received on the in-vehicle network of one of the vehicles (vehicle 1010a, for example) obtained by communicator 810 after the obtainment of the plurality of frames, log analyzer 840 has a function of determining an abnormality level or the presence or absence of abnormality for this frame received on the in-vehicle network of the vehicle.

Log analyzer 840 may construct, for example, a predetermined model for a frame transmitted on the in-vehicle network in a normal state. This predetermined model may be used for comparison with a case in an abnormal state. Then, log analyzer 840 may adjust (or update) the predetermined model through machine learning based on the log information obtained sequentially.

In this case, log analyzer 840 may perform processing (such as a multivariate analysis) on the information about the plurality of frames indicated by the collected log information, as appropriate. Then, log analyzer 840 may provide this result for learning of the predetermined model. The learning of the predetermined model may be achieved by either supervised or unsupervised learning.

For example, suppose that the in-vehicle network system of the vehicle has a fraud detection function of detecting, on the basis of a predetermined rule, that a frame inappropriate for the predetermined rule (that is, a fraud frame) is transmitted on the CAN bus. In this case, the log information may include distinction information as to whether the current frame is fraudulent. Then, log analyzer 840 may perform supervised learning on the predetermined model on the basis of the distinction information.

Moreover, log analyzer 840 may collect the log information about non-fraudulent frames from the vehicles or the log information without the distinction information indicating whether the frame is fraudulent. On the basis of such log information, log analyzer 840 may perform unsupervised learning on the predetermined model.

This predetermined model is used for calculating the abnormality level (severity of abnormality) of the frame received on the in-vehicle network of one of the vehicles. Details of the predetermined model only have to be usable for calculating the abnormality level of the frame.

The abnormality level is calculated through a comparison between the information about this frame and the predetermined model (that is, through arithmetic processing using the information about the frame and the predetermined model). For example, on the basis of the log information of the vehicles belonging to the same type, log analyzer 840 may construct the predetermined model that is used for calculating the abnormality level and indicates distribution of a feature amount of the frame received on the in-vehicle network in the normal state. More specifically, the predetermined model may indicate distribution of, for example, feature vectors including components of frame contents, a time interval between frame receptions, and a frequency of frame reception.

When the abnormality level is an objective variable and the log information is an explanatory variable, the predetermined model may indicate a relationship between the objective variable and the explanatory variable. For example, the abnormality level may be 0 (zero) when nothing abnormal is detected (i.e., in the normal state), and may be a positive value appropriate to the severity of abnormality when an abnormality is detected. The abnormality level may be binary and take 0 (no abnormality detected, for example) and 1 (abnormality detected, for example). Alternatively, the abnormality level may take three or more values to classify the detected abnormality into a plurality of levels.

An abnormality may be determined as being present when the abnormality level exceeds a predetermined threshold. As an example, the abnormality level of the frame received on the in-vehicle network of one of the vehicles may be calculated by determining whether the feature amount of this frame is within a range having a boundary threshold determined by multiplying, by a predetermined coefficient (3, for example), a standard deviation of the distribution (such as a normal distribution identified by an average value and dispersion) of the feature amount indicated by the predetermined model determined based on the already-collected log information. Moreover, the abnormality level may be classified into the plurality of levels using a plurality of predetermined coefficients. Examples of the method of constructing the predetermined model used for calculating the abnormality level include an outlier detection method and a change-point detection method for detecting a rapid change in a time series.

In this way, on the basis of the information about the plurality of frames received on the in-vehicle networks of the vehicles and indicated by the collected log information (the vehicle log information), log analyzer 840 calculates, for example, the abnormality level of the frame received on the in-vehicle network of one of the vehicles after the reception of the plurality of frames. The information about the frame received on the in-vehicle network of this vehicle can be obtained from the log information of this vehicle.

Suppose that an abnormality is detected (i.e., that an attack frame is detected) on the basis of the abnormality level calculated for the frame received on the in-vehicle network of one of the vehicles. In this case, log analyzer 840 notifies result notifier 850 of the analytical result so that the manager of the in-vehicle network monitoring system or the security analyst of the security operation center is notified about the occurrence of the fraudulent event.

Log analyzer 840 sequentially performs various analytical processes, such as the statistical process based on the collected log information, the update (learning) process for the predetermined model, and the calculation process for the abnormality level of the frame received on the in-vehicle network of the vehicle.

Then, log analyzer 840 stores the result of the analytical processes (for example, information indicating the updated predetermined model and information about the calculated abnormality level) into analytical result storage DB 882 for the reuse in the analytical processes next time (i.e., calculation of the abnormality level of the frame, for example). The data stored in analytical result storage DB 882 is described later with reference to FIG. 6.

Suppose that processing determiner 820 or log analyzer 840 determines that manager U of the in-vehicle network monitoring system needs to be notified about the occurrence of a fraudulent event. For such a case, result notifier 850 includes a means for notifying manager U of the in-vehicle network monitoring system of information about the fraudulent event to be stored in analytical result storage DB 882.

For example, result notifier 850 is connected to a display and displays the occurrence of the fraudulent event on the display. Moreover, result notifier 850 may function as a Web server or a mail server for notifying manager U about the fraudulent event by email.

Here, a notification destination does not need to be manager U of the in-vehicle network monitoring system and may be the security analyst of the security operation center commissioned to monitor the in-vehicle networks, for example.

Receiver 860 receives an operation to handle the fraudulent event from manager U of the in-vehicle network monitoring system. For example, receiver 860 may include a graphical user interface (GUI) and receive the operation to handle the fraudulent event via the GUI. Here, receiver 860 may include a microphone and receive the operation to handle the fraudulent event through a voice recognition process performed on voice of manager U obtained by the microphone.

Examples of handling includes the following: issuing the alert to a target, such as a passenger of the vehicle; remotely controlling, for example, running of the vehicle; updating the encryption key used for applying the encryption process to the vehicle; updating the in-vehicle network system; disabling the self-driving system or the driver assistance system; disabling the function of the audio head unit or the external communication module; shifting the vehicle to the fail-safe mode; and making a voice call to an operator.

When receiving the handling processing from the manager of the in-vehicle network monitoring system, receiver 860 notifies handler 870 of details of this processing.

Handler 870 performs the processing for handling the fraud occurring to the in-vehicle network. To achieve the details of the processing notified by receiver 860, handler 870 notifies communicator 810 of communication details on the basis of the information stored in security information DB 883. The data stored in security information DB 883 is described later with reference to FIG. 7.

To handle the fraud occurring to the in-vehicle network of at least one of the vehicles, handler 870 performs at least one of the following, for example:

(a) notifying a manager present outside fraud detection server 80 about the occurrence of the fraud;

(b) transmitting, to the vehicle, a control signal to disable the self-driving function and the driver assistance function;

(c) updating encryption key information included in the vehicle;

(d) notifying the vehicle about the shift to the functional safety mode;

(e) notifying the vehicle about the shift to a remote control mode;

(f) making a voice call to an operator present outside the vehicle;

(g) forcefully terminating the information-related system included in the vehicle; and (h) updating firmware of an electronic control device included in the vehicle.

The processing for handling the fraud occurring to the in-vehicle network may be performed only when the priority is a second predetermined value or higher. The second predetermined value is 1, for example.

Setting determiner 890 sets a lower limit of the priority of the notification information transmitted from the at least one vehicle to fraud detection server 80. Setting determiner 890 first measures a processing load of fraud detection server 80. When the measured processing load of fraud detection server 80 is a predetermined value or higher, setting determiner 890 raises the lower limit of the priority and then notifies the vehicle of the raised lower limit. The predetermined value may be 70% to 80%, for example. Note that setting determiner 890 is not an absolute necessity.

In the present embodiment, fraud detection server 80 includes receiver 860 and handler 870. However, receiver 860 and handler 870 do not need to be included in the same server. For example, an incident response server that executes handling may be provided separately from fraud detection server 80 that makes notification about the result of the log analysis. Then, this incident response server may include receiver 860 and handler 870.

1.4 Vehicle Information DB

FIG. 4 illustrates an example of the vehicle information stored in vehicle information DB 880 of fraud detection server 80. As shown in FIG. 4, vehicle information includes design information common to the vehicles of the same type. The design information associates the following with each other: an ID of an ECU included in the vehicle of this type (such as a model identifying the type of ECU); an ID of a frame transmitted by the ECU (that is, a CAN message ID); identification information of a bus on which the frame is transmitted; and information as to whether the frame includes a MAC.

Here, the vehicle information is not limited to the above. For example, the vehicle information may include a frame-transmission setting cycle or a signal table that divides data fields of the frame into appropriate fields.

The vehicle information in FIG. 4 shows, for example, that an ECU included in the vehicle network of vehicle type A and having an ECU ID "001" transmits a frame having a CAN message ID "0x100" and a frame having a CAN message ID "0x101".

Moreover, the vehicle information shows that the frame having the CAN message ID "0x100" is transmitted to bus 10 and that the frame having the CAN message ID "0x101" is transmitted to bus 20. As shown, each of these frames includes a MAC.

Similarly, the vehicle information in FIG. 4 shows that an ECU having an ECU ID "002" transmits a frame having a CAN message ID "0x200" to bus 10 without a MAC.

Furthermore, the vehicle information in FIG. 4 shows that an ECU included in the vehicle network of vehicle type B and having an ECU ID "001" transmits a frame having a CAN message ID "0x110" and a frame having a CAN message ID "0x111".

Moreover, the vehicle information shows that the frame having the CAN message ID "0x110" is transmitted to bus 10 and that the frame having the CAN message ID "0x111" is transmitted to bus 20. As shown, each of these frames includes a MAC.

Similarly, the vehicle information in FIG. 4 shows that an ECU having an ECU ID "003" transmits a frame having a CAN message ID "0x301" to bus 30 together with a MAC.

In this example, although the vehicle of vehicle type A and the vehicle of vehicle type B include the ECUs of the same kind (that is, the ECUs having the ECU IDs "001"), the frames transmitted by these ECUs have the different CAN message IDs. In this way, the ECUs of the same kind can be included in the vehicles of different types. The frames transmitted by the ECUs of the same kind that are included in the vehicles of different types are identical except for the CAN message IDs.

1.5 Vehicle Log Storage DB

Figure 5:
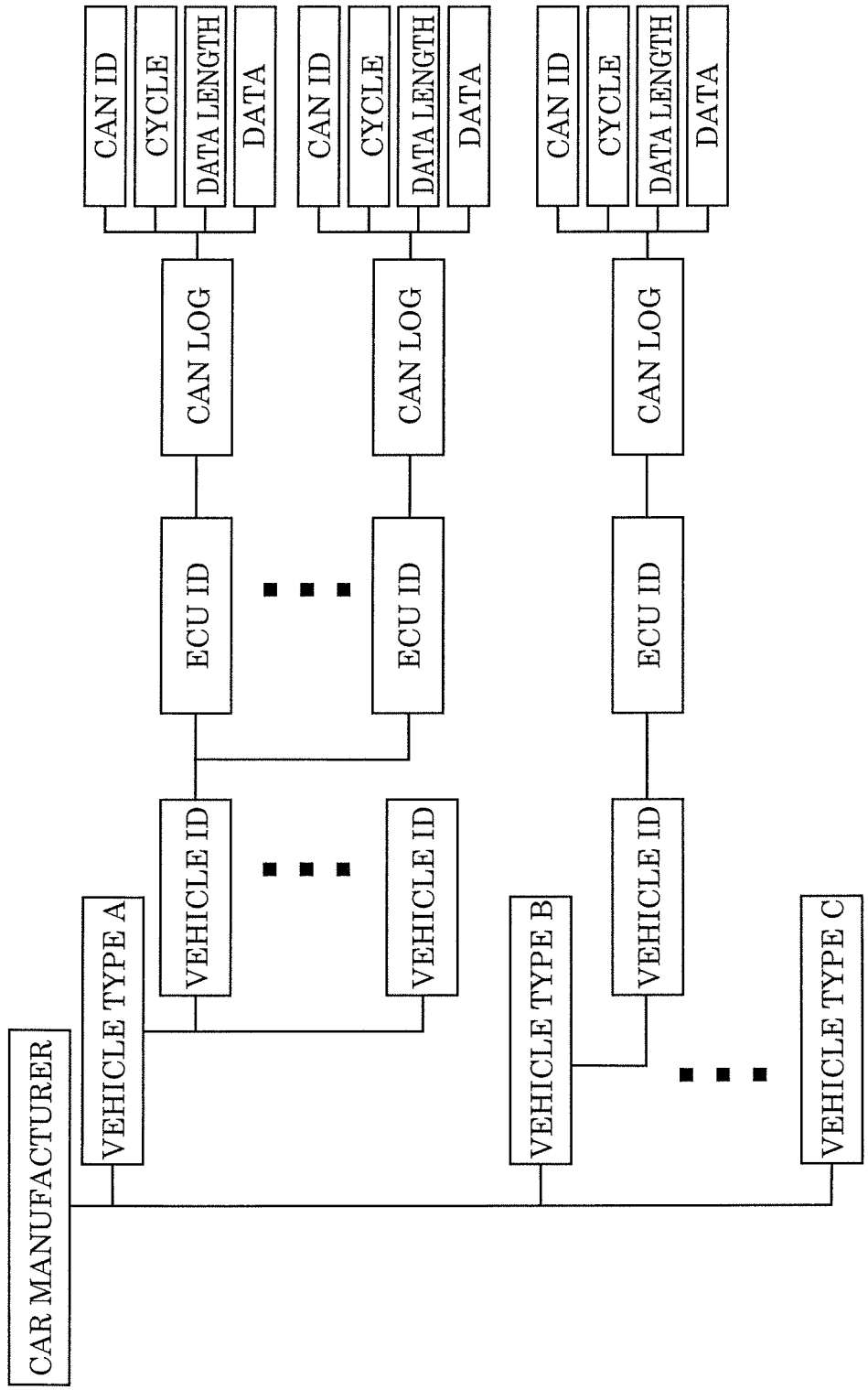
FIG. 5 illustrates an example of vehicle logs stored in a vehicle log storage DB according to Embodiment 1.

FIG. 5 illustrates an example of vehicle log information stored in vehicle log storage DB 881 of fraud detection server 80. As shown in FIG. 5, the vehicle log information indicates each of the vehicles of the different types manufactured by a car manufacturer, in association with a vehicle type, a vehicle ID for identifying the vehicle for each type, an ECU ID of the ECU included in the vehicle, and a CAN log indicating information about the frame transmitted by the ECU. This vehicle log information is a collection of log information obtained by fraud detection server 80 from the vehicles.

Here, a CAN log indicates, for example, identification information (ID) of a CAN frame, a frame reception cycle, a data length indicated by the DLC of the frame, and data included in a data field of the frame. The CAN log is information based on the log information received from the vehicle.

Each of the information items indicated by the CAN log may be a normalized feature amount (such as a feature vector) of a CAN frame indicated by the log information.

Here, the vehicle type in the vehicle log information is identifiable from the vehicle ID, for example. The analytical processing based on this vehicle log information allows log analyzer 840 to, for example, calculate the abnormality level of the frame received on the in-vehicle network of one of the vehicles.

Although not illustrated in FIG. 5, vehicle log storage DB 881 may include meta information, such as a state of the vehicle, location information, or a process priority.

1.6 Analytical Result Storage DB

FIG. 6 illustrates an example of analytical results stored in analytical result storage DB 882 of fraud detection server 80. As shown in FIG. 6, the analytical result includes a vehicle type, a vehicle ID, a time of day, location information, a state of vehicle, detected abnormality, and a priority.

For example, the analytical results in FIG. 6 indicate that the vehicle belonging to vehicle type A and having the vehicle ID "1010*a*" runs at a high speed in Tokyo on May 6, 2020 at 13:51:30. At this time, an abnormality indicated as "high load on bus", which means the bus is under a high load, is detected as shown. Moreover, the priority notified by gateway 900 in addition to the above information is "3" as shown.

Similarly, the analytical results indicate that the vehicle belonging to vehicle type A and having the vehicle ID "1010*a*" runs at a high speed in Tokyo on May 6, 2020 at 13:51:20. At this time, an abnormality indicated as "high load on bus" is detected as shown. Moreover, the priority notified by gateway 900 in addition to the above information is "2" as shown.

Furthermore, the analytical results indicate that the vehicle belonging to vehicle type A and having the vehicle ID "1010*a*" runs in Osaka on May 6, 2020 at 13:41:18. At this time, an abnormality indicated as "false message detected", which means that a false message has been detected, is detected as shown. Moreover, the priority notified by gateway 900 in addition to the above information is "2" as shown.

Although the location information is indicated by prefecture in FIG. 6, GPS information may be used instead, for example.

1.7 Security Information DB

FIG. 7 illustrates an example of security information stored in security information DB of fraud detection server 80. As shown in FIG. 7, the security information holds a table of processes that are executable and inexecutable by the vehicles.

The manager of the in-vehicle network monitoring system determines a process, among the processes executable by the corresponding vehicle type, that is to be executed to handle the fraud occurring to the in-vehicle network. As shown in the example of FIG. 7, vehicle type A is capable of disabling the driver assistance function and updating the firmware but uncapable of remote control. Moreover, vehicle type B is capable of disabling the driver assistance function, executing remote control, and updating the firmware, as shown. Furthermore, vehicle type C is capable of updating the firmware but uncapable of disabling the driver assistance function and executing remote control as shown. As with vehicle type A, vehicle type D is capable of disabling the driver assistance function and updating the firmware but uncapable of remote control as shown.

1.8 Configuration of Gateway

Figure 8:
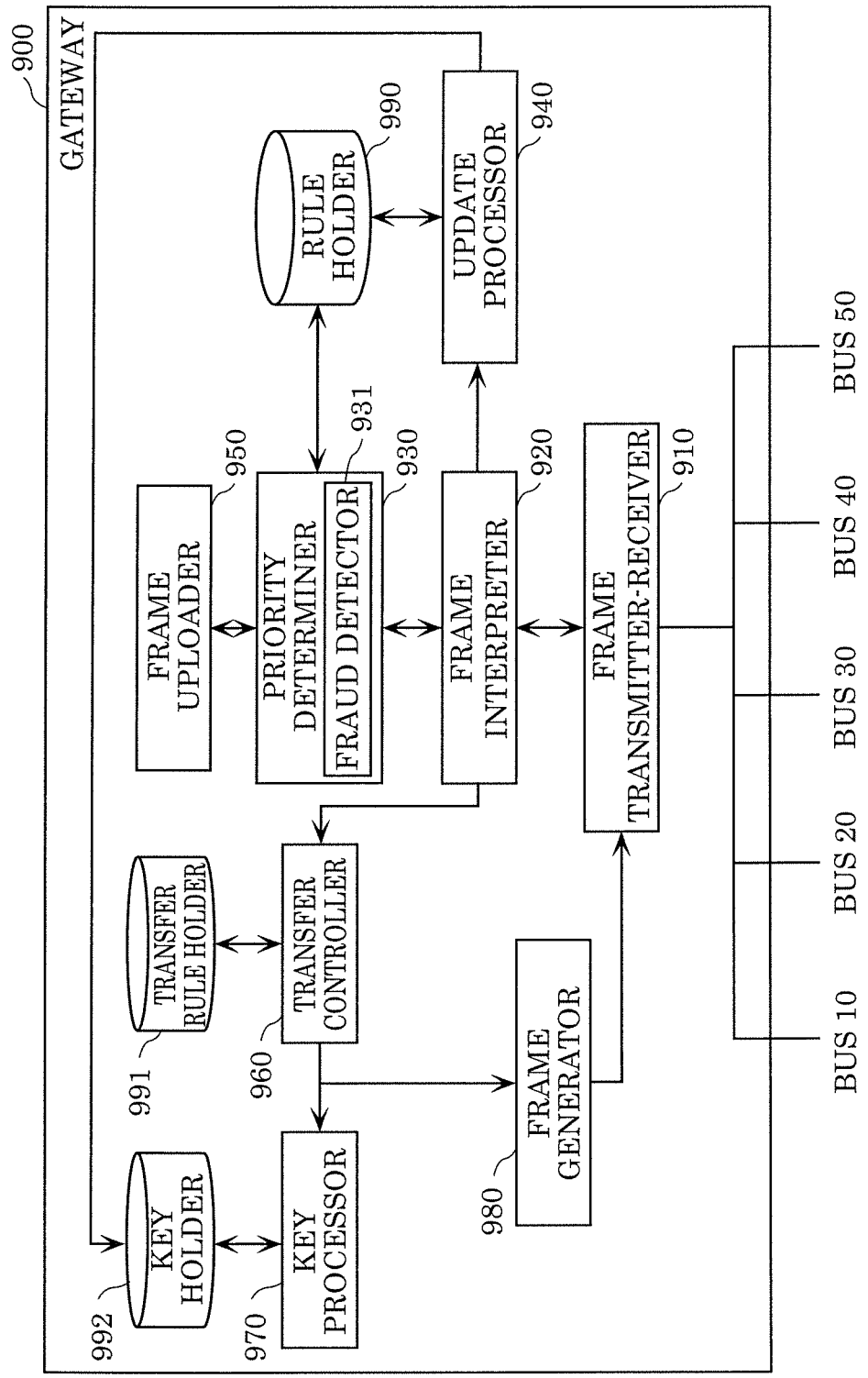
FIG. 8 illustrates a configuration of a gateway according to Embodiment 1.

FIG. 8 illustrates a configuration of gateway 900 included in the in-vehicle network of one of the vehicles (vehicle 1010*a*, for example). Gateway 900 is an ECU that notifies fraud detection server 80, which is located outside the vehicle, of the information about the in-vehicle network system including the in-vehicle network.

As shown in FIG. 8, gateway 900 includes frame transmitter-receiver 910, frame interpreter 920, priority determiner 930, update processor 940, frame uploader 950, transfer controller 960, key processor 970, frame generator 980, rule holder 990, transfer rule holder 991, and key holder 992.

Each of functions of these structural components is achieved by, for example, the communication circuit of gateway 900 and a processor or digital circuit executing a control program stored in a memory. For example, frame uploader 950 and update processor 940 are implemented by communication circuits for communicating with fraud detection server 80.

Frame transmitter-receiver 910 transmits and receives frames to and from buses 10, 20, 30, 40, and 50 according to the CAN protocol. Frame transmitter-receiver 910 receives a frame one bit at a time from the bus and then notifies frame interpreter 920 of the received frame. Frame transmitter-receiver 910 corresponds to a first communicator.

Moreover, on the basis of a transmission frame and bus information indicating one of the buses as a transfer destination notified by frame generator 980, frame transmitter-receiver 910 transmits contents of the frame one bit at a time to the transfer-destination bus specified from among buses 10, 20, 30, 40, and 50.

Frame interpreter 920 receives frame values from frame transmitter-receiver 910, and then interprets and maps the values into fields in a frame format defined by the CAN protocol. Frame interpreter 920 notifies priority determiner 930 of information about the fields of the received frame. Frame interpreter 920 corresponds to a vehicle log extractor that extracts the information about the in-vehicle network on the basis of the message received by frame transmitter-receiver 910.

When determining that the received frame does not conform to the CAN protocol, frame interpreter 920 instructs frame generator 980 to transmit an error frame.

When receiving the error frame, that is, when interpreting that the error frame is received on the basis the values of the received frame, frame interpreter 920 discards this frame after this, or more specifically, terminates interpretation of the error frame.

Priority determiner 930 determines the priority using at least one of the following: a state of the vehicle including the in-vehicle network system; an identifier of a message communicated on the in-vehicle network; and a result of fraud detection performed on the message.

To be more specific, priority determiner 930 determines the priority that is to be included in the message transmitted to fraud detection server 80, by reference to the priority rule held by rule holder 990. As one example, the running state of the vehicle is determined and, when the vehicle is currently running, the priority is determined as "medium". The rule held by rule holder 990 is described later with reference to FIG. 9. Here, although the priority is phrased as being "determined" by priority determiner 930, the priority can also be phrased as being "judged" or "calculated".

After determining the priority, priority determiner 930 notifies frame uploader 950 of the received frame and the determined priority. Priority determiner 930 has, for example, a timer holding a starting time after the turn-on of an ignition of the vehicle or a memory holding a counter indicating the number of received frames. With this, priority determiner 930 calculates the number of received frames per unit time (a second, for example) for each of the buses.

Moreover, priority determiner 930 includes a memory holding a current state of the vehicle. For example, information about a current speed or acceleration of the vehicle is stored.

Here, the state of the vehicle is information calculated on the basis of the message received by frame transmitter-receiver 910, and may be information including at least one of: a speed of the vehicle, acceleration of the vehicle, a steering angle of the vehicle, an operating condition of the driver assistance function of the vehicle, and a bandwidth occupancy rate of the in-vehicle network.

Moreover, priority determiner 930 may determine the priority to be higher when a type of the message determined by the identifier of the message includes one of the following: a control message related to the driver assistance function or the self-driving function; a message related to firmware-updating of the electronic control device included in the vehicle; a message related to a notification about the running state of the vehicle; and a diagnostic message of the vehicle.

Furthermore, the aforementioned result of the fraud detection may include a result of verification performed on the message authentication code included in the message communicated on the in-vehicle network. In this case, priority determiner 930 determines the priority to be higher when the result of the verification performed on the message authentication code is negative.

Moreover, priority determiner 930 may include fraud detector 931 that detects fraud of a message communicated on the in-vehicle network. In this case, the result of the fraud detection performed on the message is information indicating whether fraud detector 931 detects fraud in the message. Priority determiner 930 determines the priority to be higher when the result of the fraud detection indicates that the fraud is detected in the message.

Update processor 940 updates the priority rule held by rule holder 990 on the basis of information received from fraud detection server 80.

Frame uploader 950 sequentially obtains the frame, which is notified by priority determiner 930, received from one of the CAN buses and then transmits (uploads), to fraud detection server 80, the log information including the information about the received frame (about the contents of the frame, the time interval between the frame receptions, and the frequency of frame reception, for example). Frame uploader 950 corresponds to a second communicator.

Here, frame uploader 950 also uploads the priority notified by priority determiner 930 as the meta information together with the log information. The meta information may further include other various kinds of information (such as the vehicle state information, the basic safety message, the vehicle location information, and the bus load factor).

Frame uploader 950 further adds the identification information of the vehicle (the vehicle ID) to the log information. Frame uploader 950 may perform processing on the frame contents, the time interval between the frame receptions, or the frequency of frame reception so that the information about the received frame is handled more easily when fraud detection server 80 performs the statistical process or machine learning, for example.

The time interval between the frame receptions refers to a temporal difference between the time the current frame is received and the time a frame having the same ID as this current frame is received last time.

The frequency of frame reception refers to the number of frames having the same ID as this current frame that have been received in a fixed unit time, for example. The aforementioned processing includes extracting the feature amount from the features, such as the frame contents, the time interval between frame receptions, and the frequency of frame reception and then normalizing the extracted feature amount to reduce an information amount of the feature amount. The reduction in the information amount of the feature amount is achievable by, for example, representing the feature amount by a feature vector as a corresponding component and then applying a dimensionality reduction algorithm like a principal component analysis to the number of dimensions of the feature vector on the basis of the information obtained cooperatively with fraud detection server 80.

Whenever receiving the notification from priority determiner 930, frame uploader 950 may transmit the log information including the information about the current frame to fraud detection server 80. Alternatively, frame uploader 950 may not transmit the log information, depending on the priority. However, rapid transmission of the information about the frame received from the CAN bus to fraud detection server 80 enables fraud detection server 80 to rapidly detect whether this frame is abnormal.

To reduce a traffic volume in communicating with fraud detection server 80, frame uploader 950 may transmit compressed log information to fraud detection server 80 unconditionally or depending on a communication state, for example. Moreover, frame uploader 950 may transmit the log information including information about only frames having a specific ID or different IDs among the frames received by frame transmitter-receiver 910 from the CAN buses, instead of the log information including information about all the received frames.

Frame uploader 950 holds past notification information previously transmitted to fraud detection server 80. Before transmitting new notification information to fraud detection server 80, frame uploader 950 may disable transmission of this notification information when the past notification information matches with a predetermined part of the following included in the new notification information: the identifier of the message related to the information about the in-vehicle network; the result of the fraud detection performed on the message; and the priority. Here, the notification information includes the identifier of the message related to the information about the in-vehicle network included in the notification information.

When the priority is the first predetermined value or lower, frame uploader 950 may perform a process of disabling transmission of the notification information to fraud detection server 80 or a process of transmitting the notification information to fraud detection server 80 at a first timing having predetermined communication intervals. When the priority is the second predetermined value or higher, frame uploader 950 may transmit the notification information to fraud detection server 80 at a second timing different from the first timing.

In response to the notification from fraud detection server 80, gateway 900 performs the functions, such as updating the firmware, disabling the driver assistance function, and executing remote control, by transmitting necessary information to predetermined ECUs via the CAN buses, for example.

According to a transfer rule held by transfer rule holder 991, transfer controller 960 selects the bus as the transfer destination on the basis of the ID of the received frame and the transfer-source bus (i.e., the bus that received this frame). Then, to request the transmission, transfer controller 990 notifies frame generator 980 of bus information indicating the transfer-destination bus and contents of the frame to be transferred (such as the ID, DLC, and data notified by frame analyzer 920).

In response to the transmission request from transfer controller 960, frame generator 980 generates a transmission frame using the contents of the frame notified by transfer controller 960. Then, frame generator 980 notifies frame transmitter-receiver 910 of this transmission frame and the bus information (such as the identifier of the transfer-destination bus).

Transfer rule holder 991 holds transfer rule information indicating a frame transfer rule for each bus. The transfer rule information indicates each possible transfer-source bus in association with the transfer-destination bus and the ID of the frame received and to be transferred on this bus.

The transfer rule information includes information indicating whether the frame contents are required to be encrypted on the current bus and whether the frame is required to have a MAC on the current bus. When the transfer destination supports encryption, transfer controller 960 refers to this information and causes key processor 970 to decode the frame contents using an encryption key held by key holder 992 and shared among the ECUs connected to the transfer-source bus.

When the transfer destination supports encryption, transfer controller 960 performs control by instructing key processor 970 to encrypt and transfer the frame contents using an encryption key held by key holder 992 and shared among the ECUs connected to the transfer-destination bus.

Key processor 970 may use any methods for encrypting and decoding the frame contents and for generating and verifying the MAC on the basis of, for example, the frame contents.

The MAC may be generated based on a partial value in the data field of the frame, for example. Alternatively, the MAC may be generated based on a combination of the partial value and a value in a different field or other information (such as a counter value indicating the number of frame receptions).

The MAC may be calculated using a hash-based message authentication code (HMAC) or cipher-based message authentication code (CMAC), for example.

1.9 Rule Holder

FIG. 9 illustrates an example of a priority rule held by rule holder 990 of gateway 900. As shown in FIG. 9, the priority rule includes a table of conditions for determining the priority.

For example, when the speed of the vehicle obtained from the CAN frame is 0 km/h or higher, that is, when the vehicle is currently running, the priority is calculated with an addition of "+1" (or more specifically, increased by 1, and the other expressions below are also translated similarly) as shown by the priority rule in FIG. 9. When the speed of the vehicle is 80 km/h or higher, that is, when the vehicle is currently running at a high speed, the priority is calculated with an addition of "+1" as shown. The priority is also calculated with an addition of "+1" for a diagnostic frame, a frame related to firmware-updating, and a frame related to the self-driving or driver assistance function, as shown. The priority is also calculated with an addition of "+1" as shown when acceleration in forward motion or in turning exceeds 0.4 G. When a frame reception counter held by priority determiner 930 and reset every second exceeds 1000 (or more specifically, when "high load on bus" is detected), the priority is calculated with an addition of "+2" as shown because a probability of occurrence of abnormality is high. When the MAC verification is failed, the priority is calculated with an addition of "+3" as shown because the abnormality has already occurred.

Priority determiner 930 verifies the conditions held by rule holder 990 to calculate a final priority with the default as 0. Note that the priority is adjusted not to exceed a predetermined upper limit (5, for example).

Figure 10:
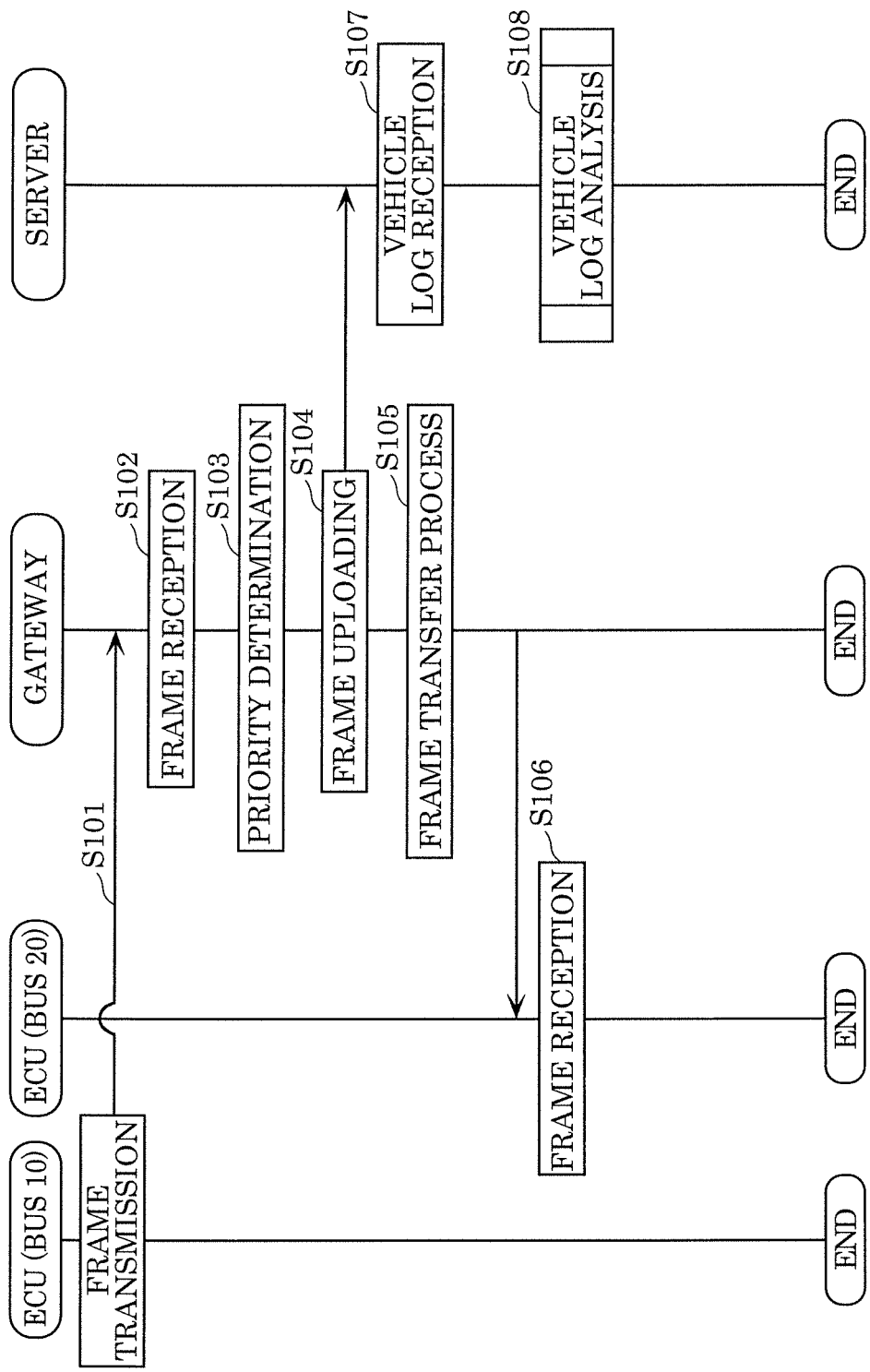
FIG. 10 illustrates an example of a processing sequence performed between a vehicle and the fraud detection server according to Embodiment 1.

1.10 Processing Sequence Performed Between Vehicle and Fraud Detection Server FIG. 10 illustrates an example of a processing sequence performed between the vehicle and fraud detection server 80. FIG. 10 mainly illustrates an example of an operation where one vehicle (vehicle 1010a) transmits, to fraud detection server 80, the information about the frame received on the CAN bus of the in-vehicle network (or more specifically, the feature vectors obtained by processing the information about the frame) and the log information including the priority information and then fraud detection server 80 analyzes the frame. To be more specific, this operation is performed when gateway 900 of the vehicle receives one frame.

Vehicle 1010a transmits the log information to fraud detection server 80 in the present example. However, the other vehicles (including vehicles 1010b, 1010c, 1010d, 1010e, and 10100 similarly transmit the log information to fraud detection server 80. The following describes the example of the operation with reference to FIG. 10.

One of the ECUs (such as ECU 100 of the engine or ECU 101 of the transmission) connected to bus 10 of in-vehicle network of vehicle 1010a starts transmitting the CAN frame to bus 10 (Step S101).

Gateway 900 of vehicle 1010a receives, from bus 10, the frame transmitted in Step S101 (Step S102).

Gateway 900 determines the priority of the received frame by reference to rule holder 990 (Step S103).

Gateway 900 causes frame uploader 950 to transmit the log information including the determined priority and the information about the frame (such as the ID, DLC, data fields, time interval between frame receptions, and frequency of frame reception) to fraud detection server 80 (Step S104).

Moreover, gateway 900 causes transfer controller 960 to perform a frame transfer process (i.e., a process of transferring the frame according to the transfer rule information) (Step S105). In the present example illustrated in FIG. 10, the frame transfer process causes gateway 900 to transfer the frame to bus 20, so that ECU 200 of the brake or ECU 201 of the steering connected to bus 20 receives the transferred frame (Step S106).

Fraud detection server 80 receives, from gateway 900, the log information including the information about the frame received on the in-vehicle network of vehicle 1010a (Step S107). Then, fraud detection server 80 performs the log analysis using the received log information (Step S108).

Next, the log analysis is described in detail with reference to FIG. 11.

1.11 Flowchart of Log Analysis Performed by Fraud Detection Server

Figure 11:
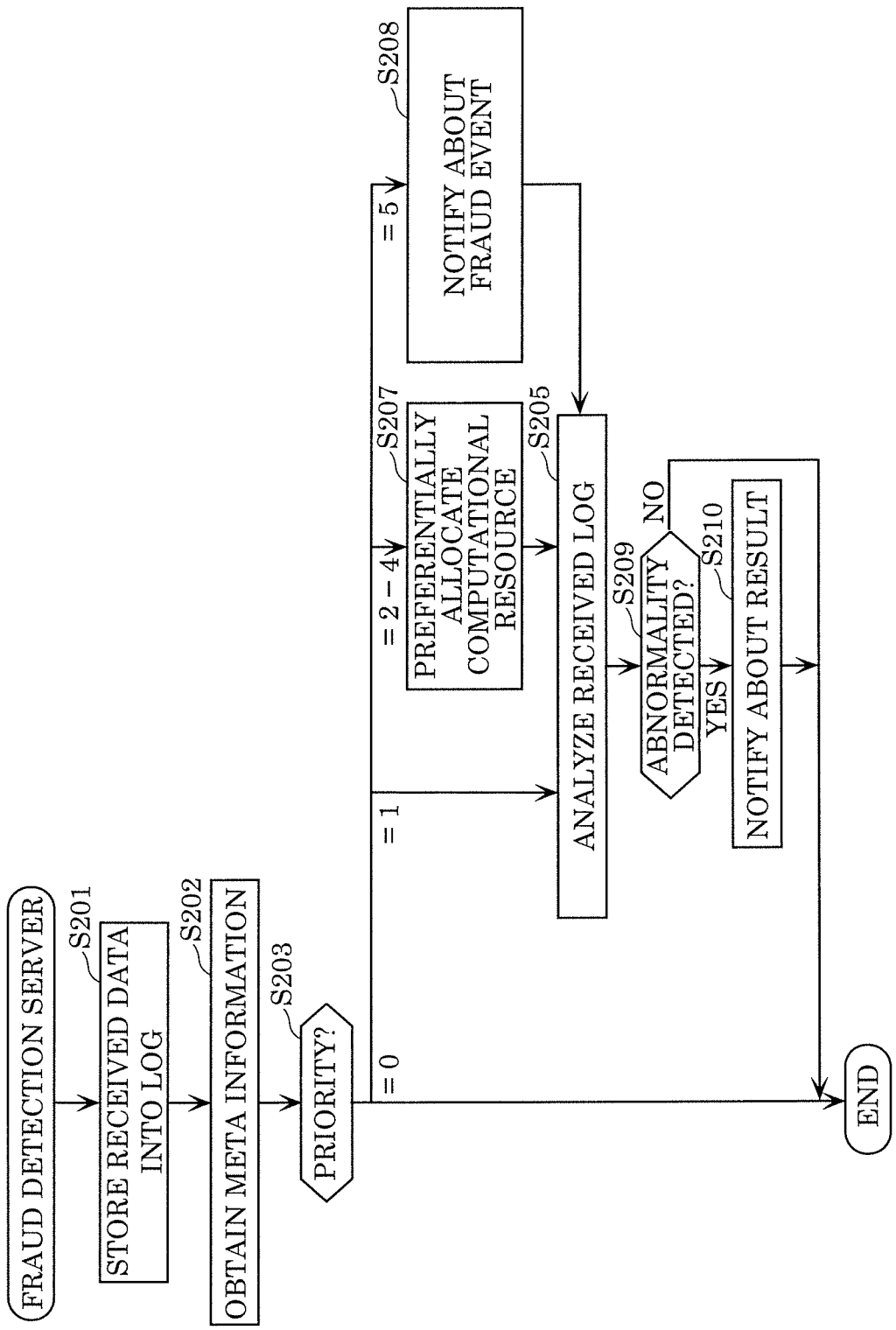
FIG. 11 is a flowchart of vehicle log analysis performed by the fraud detection server according to Embodiment 1.

FIG. 11 is an exemplary flowchart of the log analysis performed by fraud detection server 80. The following describes the log analysis with reference to FIG. 11.

Fraud detection server 80 stores the log information transmitted from the vehicle (i.e., the log information including the information about the frame received on the in-vehicle network of the vehicle) into vehicle log storage DB 881 (Step S201).

Next, fraud detection server 80 obtains the meta information, or more specifically, the priority, received together with the log information (Step S202).

Fraud detection server 80 performs a branch process according to the priority obtained in Step S202 (Step S203).

If the priority obtained in Step S202 is 0 ("=0" in Step S203), fraud detection server 80 ends the processing shown in FIG. 11.

If the priority obtained in Step S202 is 1 ("=1" in Step S203), fraud detection server 80 analyzes the log received in Step S201 (Step S205). For the log analysis, statistical abnormality detection processing, for example, is performed on the basis of the log information.

The statistical abnormality detection processing includes the process of constructing the predetermined model usable for comparison with the case in the abnormal state and the process of updating the predetermined model through machine learning. The processes are achieved by, for example, statistical processing and multivariate analysis based on the information about the frame received on the in-vehicle network, with reference to the log information received from the vehicles (i.e., the log information collected as the vehicle log information).

Moreover, the statistical abnormality detection processing includes the process of calculating the abnormality level of the frame received by vehicle 1010a. The abnormality level is calculated through the arithmetic processing (such as a comparison) performed between the aforementioned predetermined model based on the frames received on the in-vehicle networks of the vehicles in the past and the information about the frame included in the log information received from the vehicle (vehicle 1010a in this example) last time. This arithmetic processing may include outlier detection and change-point detection for detecting a rapid change in a time series.

Log analyzer 840 of fraud detection server 80, which is described above, calculates the abnormality level of the frame. Then, whether this frame is abnormal is determined by whether the abnormality level is higher than the predetermined threshold.

Fraud detection server 80 may calculate the abnormality level not only for the frame received on the in-vehicle network of vehicle 1010a, but also for a frame received on the in-vehicle network of another vehicle.

If the priority obtained in Step S202 is 2 to 4 ("=2 to 4" in Step S203), log analyzer 840 of fraud detection server 80 preferentially allocates computational resources used for the log information analysis, according to the priority (Step S207). To be more specific, more computational resources for analyzing the information about the in-vehicle network are allocated for a higher priority. In addition to or instead of this, when the priority is higher, log analyzer 840 may bring forward the analysis of the information about the in-vehicle network or determine that the analysis of the information about the in-vehicle network is performed more preferentially when determining whether this analysis is to be performed. In this way, log analyzer 840 enables the log information analysis to be performed more preferentially for the higher priority.

After this, log analyzer 840 analyzes the log received in Step S201 (Step S205). The process in Step S205 is described above. If it is determined in Step S207 that the information about the in-vehicle network is not analyzed, Step S205 is not executed.

If the priority obtained in Step S202 is 5 ("=5" in Step S203), fraud detection server 80 immediately notifies the manager of the in-vehicle network monitoring system of the received log information as a fraud event (Step S208). After this, Step S205 (log analysis) is executed.

Next, result notifier 850 verifies whether an abnormality is detected as a result of the log analysis (performed in Step S205) (Step S209). If no abnormality is detected ("NO" in Step S209), a series of processes shown in FIG. 11 is ended. If an abnormality is detected ("YES" in Step S209), result notifier 850 notifies the manager of the in-vehicle network monitoring system of the analytical result (Step S210).

1.12 Advantageous Effects of Embodiment 1

In the in-vehicle network monitoring system according to Embodiment 1, gateway 900 calculates the priority according to the priority rule held by rule holder 990 and then notifies fraud detection server 80 of the calculated priority together with the information about the frame received on the in-vehicle network. The priority rule is defined under the conditions, such as the current running state of the vehicle, the type of the received frame, the load factor of the bus observing the received frame, and the result of the verification performed on the MAC included in the frame.

Fraud detection server 80 changes the analytical processing to be performed, depending on the priority calculated under the above conditions.

With this, the log can be preferentially analyzed when the vehicle requires immediate detection, such as when the vehicle is running at a high speed or the driver assistance function is being used. Moreover, in an event at a higher level of abnormality, such as a high bus load or a failure in MAC verification, the manager of the in-vehicle network monitoring system can be effectively notified of the event without waiting for the analytical result of the log.

Embodiment 2

The following describes an in-vehicle network monitoring system that includes a server (also referred to as a fraud detection server) and a plurality of vehicles each of which has an in-vehicle network (an in-vehicle network system) allowing a plurality of electronic control units (also referred to as electronic control devices or ECUs) to communicate with each other via CAN buses. Moreover, the following also describes an information notification method for notifying the fraud detection server of information about the in-vehicle network system. A configuration of the in-vehicle network monitoring system described in the present embodiment is the same as the configuration described in Embodiment 1 (see FIG. 1).

2.1 Overall Configuration of in-Vehicle Network System

Figure 12:
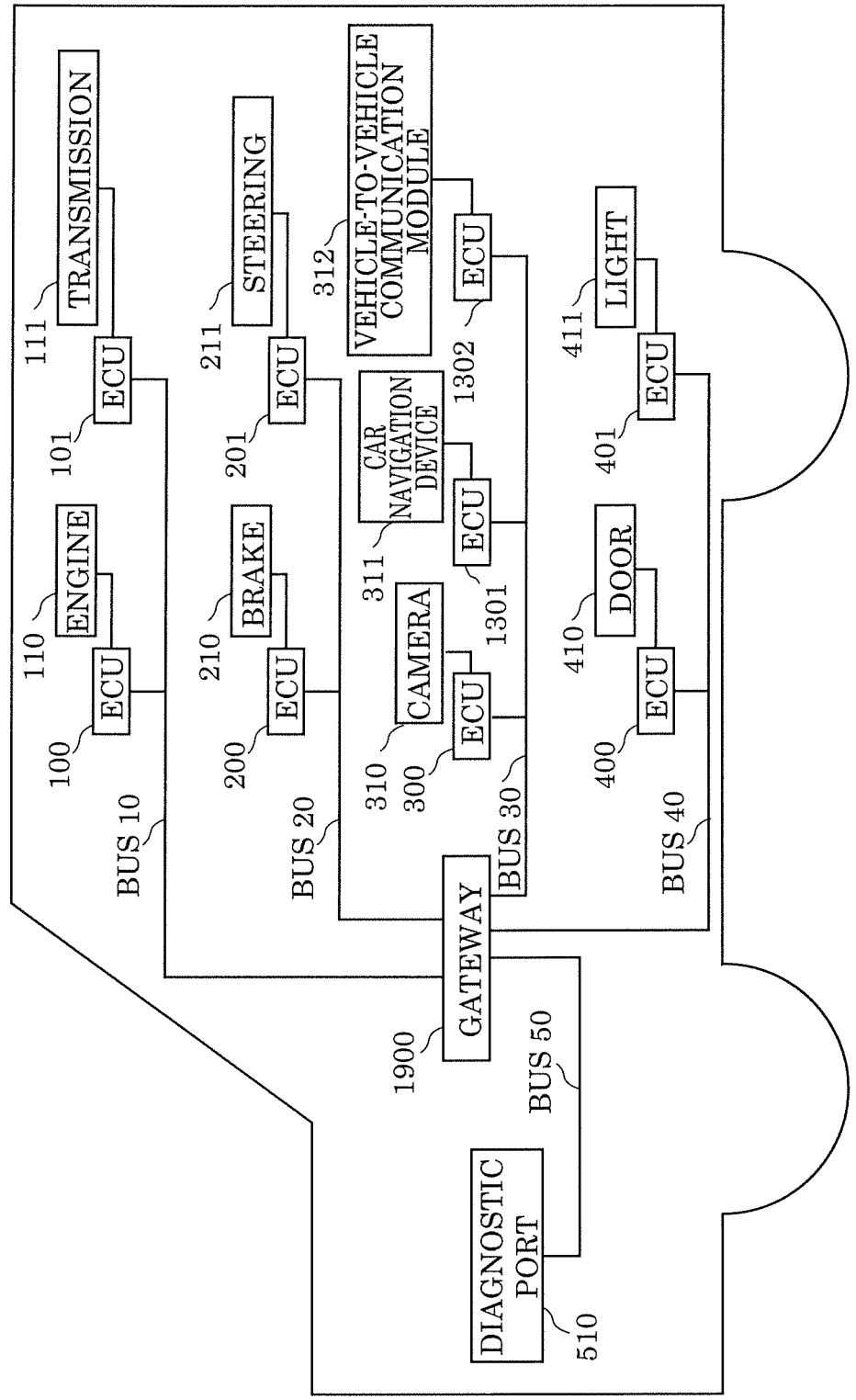
FIG. 12 illustrates a configuration of an in-vehicle network system according to Embodiment 2.

FIG. 12 illustrates a configuration of an in-vehicle network system according to the present embodiment. Structural components having the same functions as those in the in-vehicle network system according to Embodiment 1 (see FIG. 2) are assigned the same numbers as in FIG. 2, and description of these structural components is omitted.

Gateway 1900 is an ECU that connects different channels to transfer data among the channels. Gateway 1900 is connected to bus 10, bus 20, bus 30, bus 40, and bus 50.

Thus, gateway 1900 is one kind of ECU having a function of transferring a frame (a data frame) received from one of the buses connected to gateway 1900 to another bus under a certain condition (that is, a destination bus selected according to the condition).

Gateway 1900 has an intrusion detection system (IDS) function or an intrusion prevention system (IPS) function. Thus, gateway 1900 has a function of detecting a fraudulent message received on the in-vehicle network system or a function of detecting and eliminating such a message.

Moreover, gateway 1900 has a function of notifying another device of information about the detected fraudulent message via a CAN bus. The configuration of gateway 1900 is described in detail later.

Each of ECU 1301 and ECU 1302 includes a communication device (such as a communication circuit) to communicate with fraud detection server 80 located outside the vehicle. Each of ECU 1301 and ECU 1302 has a function of transmitting (uploading) information about a fraudulent message received from gateway 1900 to fraud detection server 80, for example. The configurations of ECU 1301 and ECU 1302 are described in detail later.

Gateway 1900, ECU 1301, and ECU 1302 correspond to a first electronic control device, a second electronic control device, and a third electronic control device, respectively.

2.2 Configuration of Gateway 1900

Figure 13:
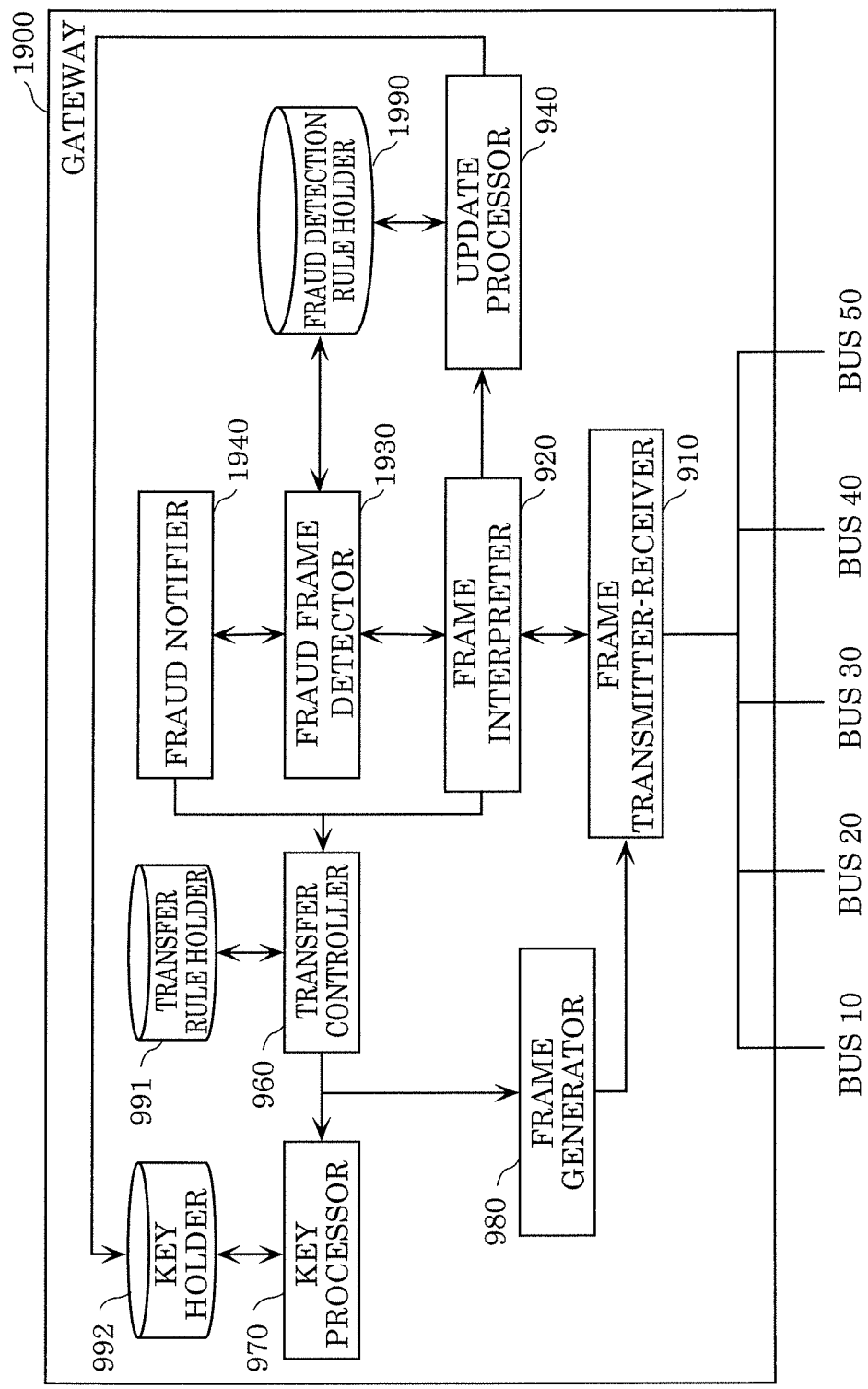
FIG. 13 illustrates a configuration of a gateway according to Embodiment 2.

FIG. 13 illustrates a configuration of gateway 1900. Gateway 1900 includes frame transmitter-receiver 910, frame interpreter 920, fraud frame detector 1930, fraud notifier 1940, update processor 940, transfer controller 960, key processor 970, frame generator 980, fraud detection rule holder 1990, and key holder 992.

The same structural components as those in Embodiment 1 are assigned the same numbers as in Embodiment 1, and description of these structural components is omitted.

Frame interpreter 920 receives frame values from frame transmitter-receiver 910 and then interprets the values, as in Embodiment 1. Frame interpreter 920 notifies fraud frame detector 1930 of information about fields of the received frame.

Fraud frame detector 1930 determines whether the frame notified by frame interpreter 920 is fraudulent by reference to fraud detection rule holder 1990. The frame is determined as being fraudulent when a specific field included in the message is a fraudulent value other than a predetermined value or when a time interval between frame receptions deviates from a predetermined reception interval, for example. When detecting the frame notified by frame interpreter 920 satisfies either one of these conditions, fraud frame detector 1930 determines this frame as being fraudulent.

When detecting a fraudulent frame, fraud frame detector 1930 notifies fraud notifier 1940 about the detection of the fraudulent frame. Fraud frame detector 1930 has a timer indicating an elapsed time from the turn-on of an ignition of the vehicle and a memory holding information about the frames received in the past. Fraud frame detector 1930 corresponds to a fraud detector.

When notified of the detection of the fraudulent frame by fraud frame detector 1930, fraud notifier 1940 requests transfer controller 960 to transmit a fraud notification frame to notify a source outside gateway 1900 about the detection of the fraudulent frame. In response to this transmission request, transfer controller 960 transmits the fraud notification frame via frame transmitter-receiver 910.

Information indicating a notification destination of the fraud notification frame or the transmission destination bus may vary depending on the detected fraud. For example, fraud detection server 80 is usually notified of the fraud notification frame via ECU 1301. When a frame transmitted by ECU 1301 is detected as being fraudulent, fraud detection server 80 is notified of the fraud notification frame via ECU 1302.

In this way, when a fraudulent device is connected to the vehicle, fraud detection server 80 is notified of the information without involving the fraudulent device. This is desirable in terms of security.

To achieve this, the fraud notification frame may include information about the notification destination (information indicating ECU 1301 or ECU 1302) so that the ID of the fraud notification frame is changed depending on the notification destination. The fraud notification frame is described in detail later with reference to FIG. 14.

Fraud detection rule holder 1990 holds determination conditions referenced by fraud frame detector 1930 to determine whether the frame is fraudulent. The data stored in fraud detection rule holder 1990 is described in detail later with reference to FIG. 15.

2.3 Fraud Notification Frame

Figure 14:
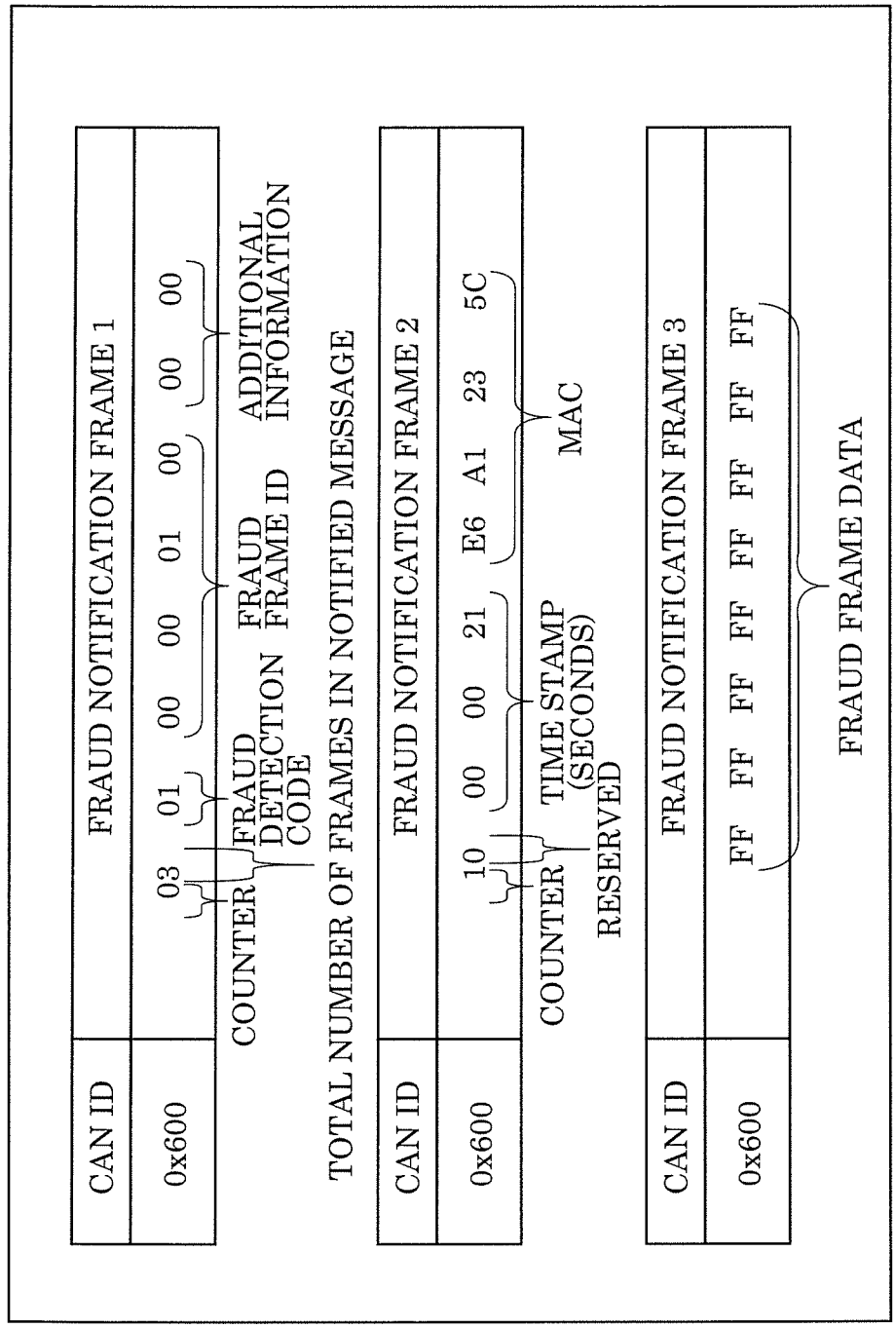
FIG. 14 illustrates an example of a fraud notification frame according to Embodiment 2.

FIG. 14 illustrates an example of a fraud notification frame transmitted from gateway 1900 to another ECU to notify about the detection of fraudulent frames. FIG. 14 illustrates the example in which the detected fraudulent frame is transmitted using three CAN frames.

In FIG. 14, each of frame fields is represented in hexadecimal notation and one hexadecimal digit represents four bits.

Fraud notification frame 1, which has the CAN ID "0x600", is transmitted from gateway 1900 to bus 30. Here, "0" representing high four bits of data is a counter indicating an ordinal rank of the fraud notification frame. Fraud notification frame 1 is a first frame and thus "0" is set.

Next, "3" representing the following four bits indicates a total number of fraud notification frames used for the current notification. In the present example, "3" is set because three fraud notification frames are used for the current notification.

Next, "01" representing the following eight bits indicates a fraud detection code. The fraud detection code represents a type of fraud detection, and indicates the rule based on which the frame is determined as being fraudulent, among the fraud detection rules stored in fraud detection rule holder 1990, for example. In the present example, "01" indicates that the time interval between frame receptions is fraudulent.

Next, the following 32 bits represent an ID of a frame detected as being fraudulent (that is, a fraud frame). The present example indicates that the frame having the ID "100" is detected as being fraudulent.

Next, the last 16 bits are used as a field for additional information related to the fraud detection. In the present example, "00 00" indicates that no particular information is included. For the fraudulent time interval between frame receptions, this field may include information indicating an actual time interval, for example.

Fraud notification frame 2, which also has the CAN ID "0x600", is transmitted from gateway 1900 to bus 30. Here, "1" representing high four bits of data is a counter indicating an ordinal rank of the fraud notification frame. Fraud notification frame 2 is a second frame and thus "1" is set.

Next, the following four bits are reserved and set as "0" having no particular meaning.

Next, the following 24 bits represent a time stamp and indicates the number of seconds elapsed after the turn-on of the ignition of the vehicle. In the present example, "21" indicates that 33 seconds have elapsed.

Next, the following 32 bits include a MAC used for verifying the validity of the fraud notification frame. To generate the MAC, the fraud frame ID, the time stamp, and the data fields of the fraud frame are calculated, and the high 32 bits are used. In the present example, the calculated MAC is represented as "E6 A1 23 5C".

Fraud notification frame 3, which also has the CAN ID "0x600", is transmitted from gateway 1900 to bus 30. Fraud notification frame 3 includes data fields of the frame detected as being fraudulent. In the present example, the date fields of the data frame having the ID "0x100" and determined as being fraudulent are indicated as "FF FF FF FF FF FF FF FF".

Fraud notification frame 3 includes no counter indicating the ordinal rank of the fraud notification frame.

The number of fraud notification frames is three in the above example. However, the number of fraud notification frames is not limited to three and may be any number at least one.

2.4 Fraud Detection Rule

FIG. 15 illustrates an example of priority rules stored in fraud detection rule holder 1990. In FIG. 15, four fraud detection rules are stored as an example.

A fraud detection rule as Rule No. 1 relates to "cycle" and defines a normal time interval between frame receptions. A target bus is "bus 10" and a CAN ID of a target frame is "100". As shown, the normal time interval is "9 to 11 ms" as a rule. To be more specific, when the time interval for receiving the data frame having the CAN ID "100" from bus 10 is outside the range of 9 to 11 ms, gateway 1900 determines that the fraud frame is received and thus transmits a fraud notification frame.

Similarly, a fraud detection rule as Rule No. 2 relates to "cycle". A target bus is "bus 20" and a target CAN ID is "200". As shown, the normal time interval is "18 to 22 ms".

A fraud detection rule as Rule No. 3 relates to "cycle". A target bus is "bus 30" and a target CAN ID is "300". As shown, the normal time interval is "36 to 44 ms".

A fraud detection rule as Rule No. 4 relates to "data". A target bus is "bus 10" and a target CAN ID is "100". As shown, normal data includes a 0th byte which is "0x00" as a rule. To be more specific, when the 0th byte in a data field of a data frame having the CAN ID "100" received from bus 10 is not "0x00", gateway 1900 determines that the fraud frame is received and thus transmits a fraud notification frame.

2.5 Configuration of ECU 1301

Figure 16:
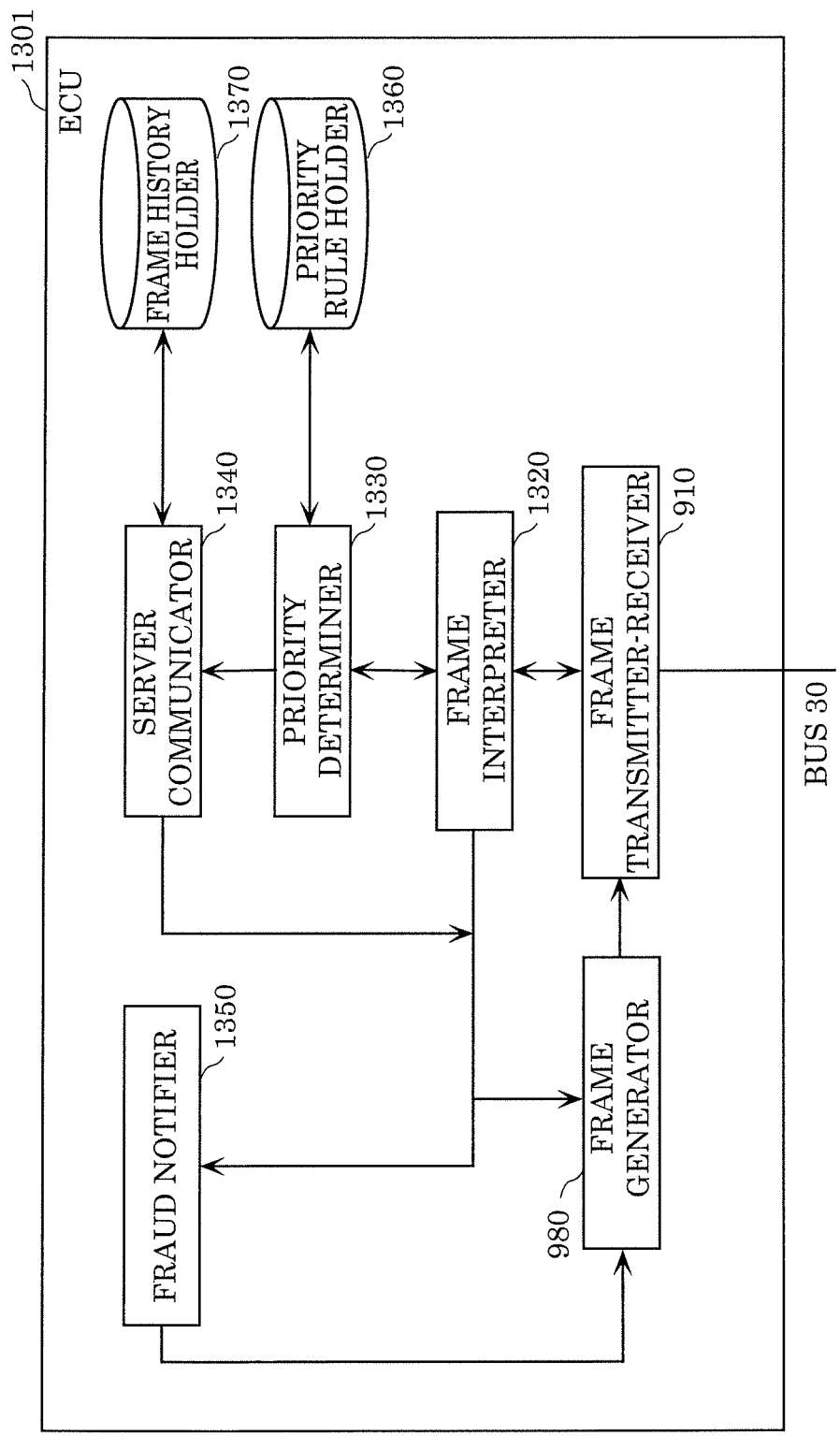
FIG. 16 illustrates a configuration of an ECU according to Embodiment 2.

FIG. 16 illustrates a configuration of ECU 1301. Here, ECU 1302 has the same configuration as ECU 1301. ECU 1301 includes frame transmitter-receiver 910, frame interpreter 1320, priority determiner 1330, server communicator 1340, connected-device communicator 1350, frame generator 980, priority rule holder 1360, and frame history holder 1370. Frame transmitter-receiver 910 of ECU 1301 may also be referred to as a fourth communicator.

Frame interpreter 1320 receives frame values from frame transmitter-receiver 910, and then interprets and maps the values into fields in a frame format defined by the CAN protocol.

Frame interpreter 1320 includes key processor 970 and key holder 992. When a frame including a MAC is received, frame interpreter 1320 verifies the validity of the frame. When the verification is failed, frame interpreter 1320 discards the frame.

Frame interpreter 1320 notifies connected-device communicator 1350 of the received frame.

Moreover, frame interpreter 1320 notifies priority determiner 1330 of the fraud notification frame received from gateway 1900 and a predetermined frame to be transmitted to fraud detection server 80. The predetermined frame includes, for example, a signal related to running of the vehicle (such as speed, steering angle, acceleration, and hydraulic pressure of brake). Frame interpreter 1320 corresponds to a second fraud detection result receiver and a second vehicle log extractor.

When determining that the received frame does not conform to the CAN protocol, frame interpreter 1320 instructs frame generator 980 to transmit an error frame.

When receiving the error frame, that is, when interpreting that the error frame is received on the basis the values of the received frame, frame interpreter 1320 discards this frame after this, or more specifically, terminates interpretation of the error frame.

Priority determiner 1330 determines the priority that is to be included in the message transmitted to fraud detection server 80, by reference to the priority rule held by priority rule holder 1360. The priority of the predetermined frame is "0", and the priority of the fraud frame included in the fraud notification frame is at least "1". The rule held by priority rule holder 1360 is described later, with reference to FIG. 17. Priority determiner 1330 corresponds to a second priority determiner.

Priority determiner 1330 determines the priority and then notifies server communicator 1340 of the frame and the determined priority. The rule held by priority rule holder 1360 is described later, with reference to FIG. 17.

Server communicator 1340 has a function of notifying fraud detection server 80 of the frame and the priority notified by priority determiner 1330. Server communicator 1340 stores information (the frame and the priority) notified by priority determiner 1330 into frame history holder 1370. Server communicator 1340 corresponds to a fifth communicator.

Server communicator 1340 receives a signal (such as speed, steering angle, acceleration, and hydraulic pressure of brake) included in a periodic communication frame and having the priority "0". Server communicator 1340 has an internal memory to continually hold a latest value. Fraud detection server 80 is notified about information of the periodic communication frame periodically (every second, for example).

When information of a frame having the priority "1" or higher (information about a frame detected as being fraudulent) is received, fraud detection server 80 is notified of this information at a timing of notification from priority determiner 1330. Here, suppose that the information transmitted to fraud detection server 80 last time has the same ID and the same fraud code as the information to be transmitted this time, by reference to frame history holder 1370. In this case, fraud detection server 80 is not notified of the information, or more specifically, notification is disabled.

Thus, when a fraud frame is continuously transmitted on the in-vehicle network, fraud detection server 80 does not need to be frequently notified of such a fraud frame having a relatively high priority. This is effective in reducing the communication traffic and the processing load of fraud detection server 80.

Server communicator 1340 receives a control command from fraud detection server 80, and notifies connected-device communicator 1350 or frame generator 980 of the received control command. The frame history held by frame history holder 1370 is described in detail later, with reference to FIG. 18.

Connected-device communicator 1350 controls a device (car navigation device 311) connected to ECU 1301. For example, when instructed by server communicator 1340 to display a security alert, connected-device communicator 1350 causes a screen of car navigation device 311 to display the security alert.

ECU 1302 has the same configuration as ECU 1301. However, priority determiner 1330 of ECU 1302 is referred to as a third priority determiner. Moreover, frame interpreter 1320 of ECU 1302 has a function corresponding to the second fraud detection result receiver, and this function is referred to as a third fraud detection result receiver. Furthermore, frame interpreter 1320 of ECU 1302 has a function corresponding to the second vehicle log extractor, and this function is referred to as a third vehicle log extractor. Frame transmitter-receiver 910 of ECU 1302 is referred to as a sixth communicator. Server communicator 1340 of ECU 1302 is referred to as a seventh communicator.

2.6 Priority Rule Holder

FIG. 17 illustrates an example of priority rules stored in priority rule holder 1360 of ECU 1301. The priority rules define priorities in association with conditions for priority determination.

According to a first priority rule shown in FIG. 17, the priority of a periodic communication frame (such as speed, steering angle, acceleration, and hydraulic pressure of brake) is "0".

According to a second priority rule shown in FIG. 17, the priority is "1" when the fraud notification frame is received and the fraud frame is unrelated to the vehicle control. The frame unrelated to the vehicle control refers to a frame including only a signal having no direct or indirect effect on control over running, turning, stopping of the vehicle. For example, such a frame relates to notification of a state, such as an opened/closed state of the door or window or a lighting state of the light.

According to a third priority rule shown in FIG. 17, the priority is "2" when the fraud notification frame is received, the fraud frame relates to the vehicle control, and the vehicle is currently stopped. The frame related to the vehicle control includes a signal directly related to the vehicle control, such as a steering instruction signal or a speed-reduction request signal. Alternatively, this frame includes a signal indirectly related to the vehicle control, such as a signal of sensor information necessary to determine control over the driver assistance function for, for example, the vehicle speed, a white-line recognition state, or a distance to a vehicle ahead.

According to a fourth priority rule shown in FIG. 17, the priority is "3" indicating a high-risk state when the fraud notification frame is received, the fraud frame relates to the vehicle control, and the vehicle is currently running.

In the present embodiment, the priority is determined depending on whether the fraud frame is related or unrelated to the vehicle control, and depending on the current state of the vehicle. However, the method for determining the priority is not limited to this. For example, the priority may be determined on the basis of a diagnostic command, a firmware-updating command, or a combination of a predetermined ID list and a fraud detection code.

2.7 Frame History Holder

FIG. 18 illustrates an example of a frame history stored in frame history holder 1370. A frame history may include a time of day of the frame, a frame type, a fraud type, a priority, and whether to notify the server.

In the example shown in FIG. 18, newly received frames are stored in descending order from top.

A first frame history shown in FIG. 18 indicates that fraud detection server 80 is notified of the periodic communication frame at the time of 341.000 (seconds) ("Notification to server"="1"). The history also indicates that no fraud is detected from this frame ("Fraud type" is "Inapplicable") and that the priority is "0".

A second frame history shown in FIG. 18 indicates that fraud detection server 80 is not notified of fraud related to the frame including the signal of shift position at the time of 340.330 (seconds) ("Notification to server"="0"). The history also indicates that this frame is fraudulent against the cycle rule ("Fraud type" is "Cycle") and that the priority is "2".

A third frame history shown in FIG. 18 indicates that fraud detection server 80 is notified of fraud related to the frame including the signal of shift position at the time of 340.230 (seconds) ("Notification to server"="1"). The history also indicates that this frame is fraudulent against the cycle rule ("Fraud type" is "Cycle") and that the priority is "2".

The third frame is transmitted whereas the second frame is not transmitted. This is because after server communicator 1340 notifies fraud detection server 80 of the frame including the shift position signal received for the first time, a similar fraud notification frame is received. Thus, notification of this similar frame to fraud detection server 80 is omitted or disabled, as shown.

A fourth frame history shown in FIG. 18 indicates that fraud detection server 80 is notified of the periodic communication frame at the time of 340.000 (seconds) ("Notification to server"="1"). The history also indicates that no fraud is detected from this frame ("Fraud type" is "Inapplicable") and that the priority is "0".

2.8 Flowchart of Processing Performed by Gateway 1900

Figure 19:
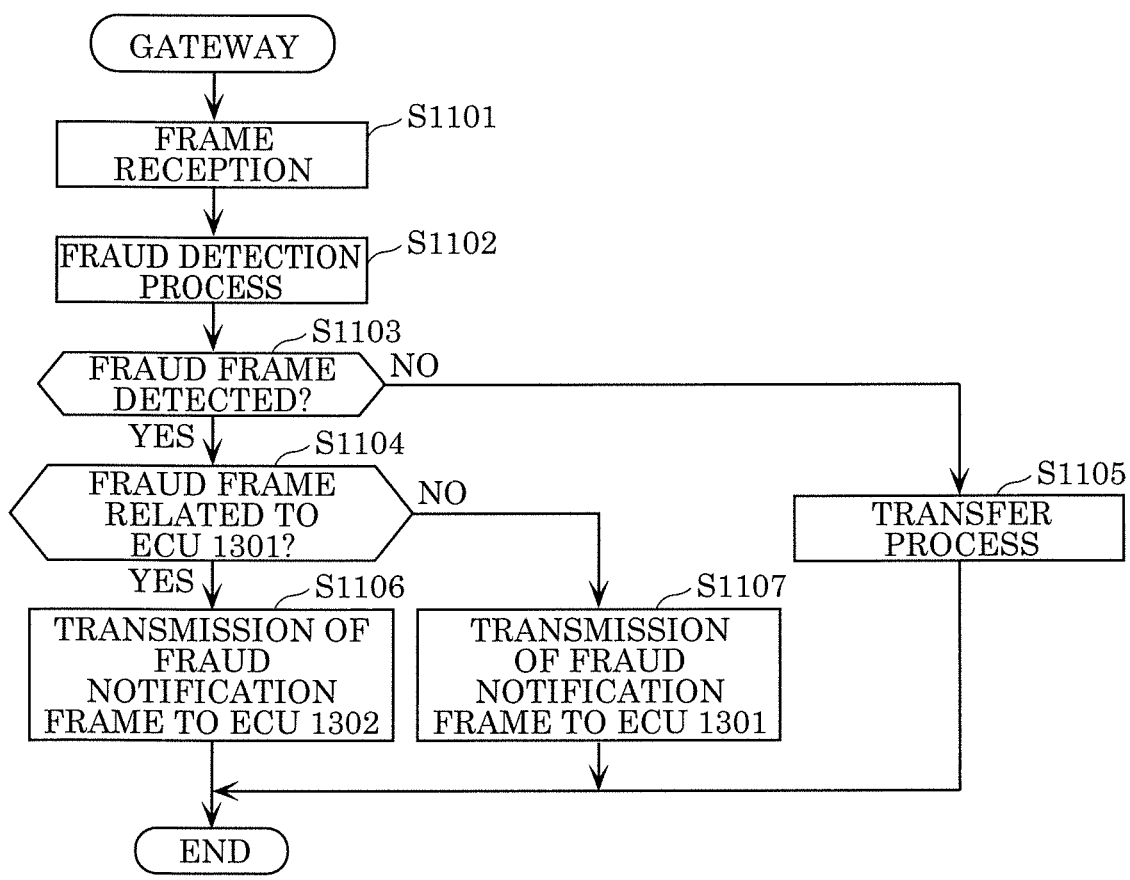
FIG. 19 is a flowchart of frame reception processing performed by the gateway according to Embodiment 2.

FIG. 19 is a flowchart of frame reception processing performed by gateway 1900. The following describes the flowchart of frame reception processing with reference to FIG. 19.

Gateway 1900 receives a frame (Step S1101).

Gateway 1900 performs a fraud detection process on the received frame (Step S1102).

Gateway 1900 determines, from the result of the fraud detection process, whether a fraud frame is detected (Step S1103).

If the fraud frame is detected in Step S1103 ("YES" in Step S1103), gateway 1900 determines whether this fraud frame relates to ECU 1301 (Step S1104). More specifically, gateway 1900 refers to the CAN ID included in this fraud frame to determine whether ECU 1301 transmits this frame.

If the ID included in the fraud frame detected in Step S1103 is determined in Step S1104 as being related to ECU 1301 ("YES" in Step S1104), gateway 1900 transmits a fraud notification frame, which indicates the detection of the fraud frame, to ECU 1302 (Step S1106). More specifically, gateway 1900 transmits, to ECU 1302, the fraud notification frame having an ID different from an ID of the fraud notification frame to be transmitted to ECU 1301 to notify the detection of the fraud frame. After this, the processing is ended.

If the ID included in the fraud frame detected in Step S1103 is determined in Step S1104 as being unrelated to ECU 1301 ("NO" in Step S1104), gateway 1900 transmits a fraud notification frame, which indicates the detection of the fraud frame, to ECU 1301 (Step S1107). After this, the processing is ended.

If no fraud frame is detected in Step S1103 ("NO" in Step S1103), gateway 1900 transfers the received frame according to the transfer rule held by transfer rule holder 991 (Step S1105). After this, the processing is ended.

2.9 Flowchart of Processing Performed by ECU 1301

Figure 20:
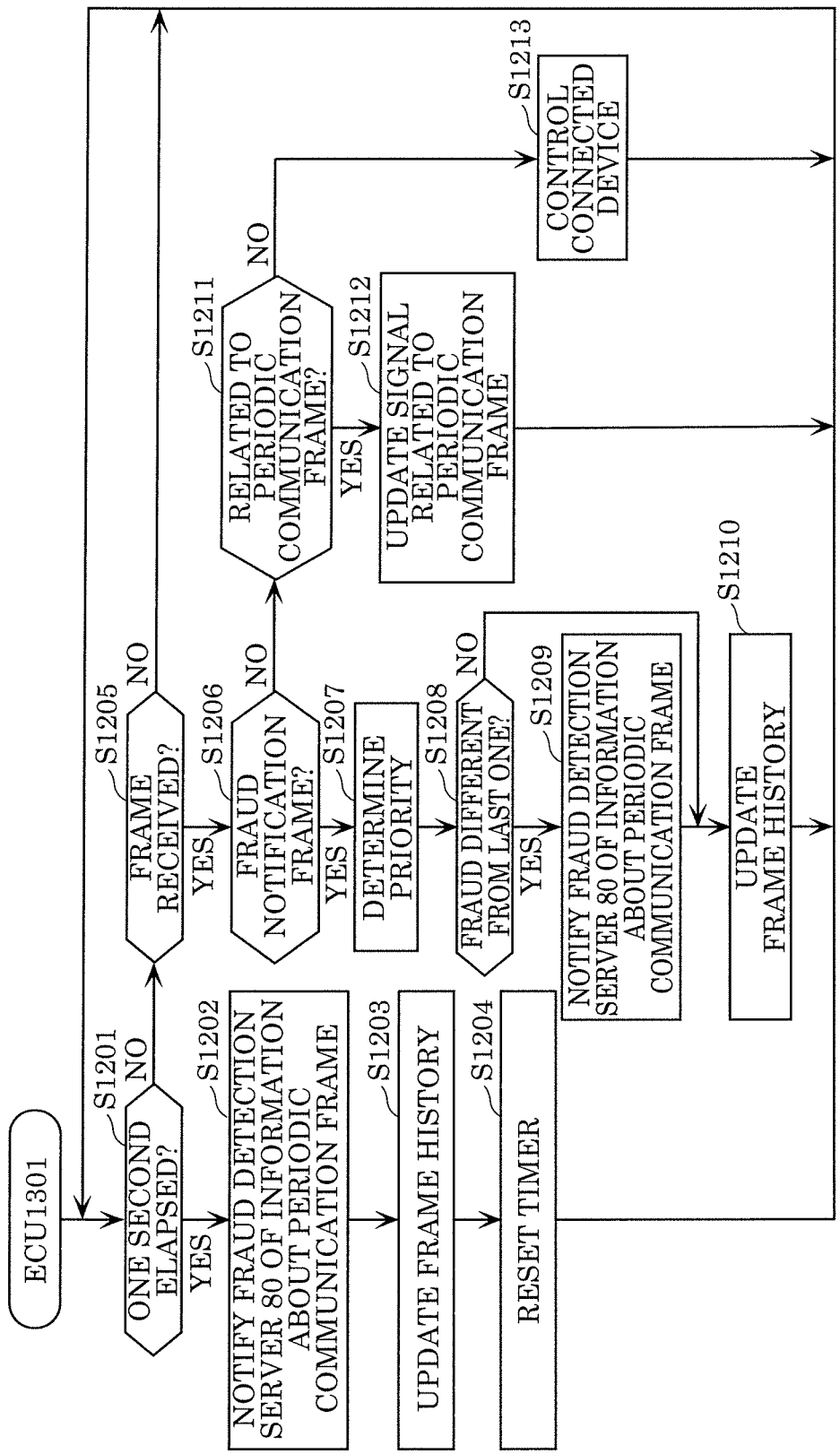
FIG. 20 is a flowchart of processing performed by the ECU according to Embodiment 2.

FIG. 20 is a flowchart of processing performed by ECU 1301. The following describes the flowchart of the processing performed by ECU 1301 with reference to FIG. 20.

A series of processes shown in FIG. 20 starts when an internal timer of ECU 1301 is reset.

ECU 1301 determines whether a predetermined time (one second, for example) has elapsed, using the internal timer (Step S1201).

If the predetermined time has elapsed ("YES" in Step S1201), ECU 1301 notifies fraud detection server 80 of the information about the periodic communication frame together with the priority (0) (Step S1202). The periodic communication frame includes the information about the latest running state of the vehicle (such as speed, steering angle, acceleration, and hydraulic pressure of brake). These information items are obtained from the frame received from bus 30.

After this, ECU 1301 updates the frame history held by frame history holder 1370 (Step S1203).

Then, ECU 1301 resets the timer (Step S1204) and returns to Step S1201.

If the predetermined time has not elapsed ("NO" in Step S1201), ECU 1301 determines whether a frame is received (Step S1205). If determining that no frame is received ("NO" in Step S1205), ECU 1301 returns to Step S1201. If determining that the frame is received ("YES" in Step S1205), ECU 1301 determines whether this frame is a fraud notification frame (Step S1206).

If the received frame is the fraud notification frame ("YES" in Step S1206), ECU 1301 refers to priority rule holder 1360 to determine the priority of the fraud notification frame (Step S1207).

After this, ECU 1301 refers to frame history holder 1370 to determine whether the received fraud notification frame is the same type as a previously-received fraud notification frame (Step S1208). More specifically, if the fraud notification frame received this time has the same CAN ID or the same fraud type as the previously-received fraud notification frame, these fraud notification frames are determined as being the same type. If the fraud notification frame received this time is the same type as the previously-received frame ("NO" in Step S1208), ECU 1301 updates the frame reception history of frame history holder 1370 instead of notifying fraud detection server 80 of the fraud notification frame (Step S1210), and returns to Step S1201. If the fraud notification frame received this time is not the same type as the previously-received frame, or more specifically, if the fraud notification frame received this time is different from the previously-received frame ("YES" in Step S1208), ECU 1301 notifies fraud detection server 80 of the information about the fraud notification frame together with the priority (Step S1209).

After this, ECU 1301 updates the frame reception history of frame history holder 1370 (Step S1210), and returns to Step S1201.

If determining that the received frame is not the fraud notification frame in Step S1206 ("NO" in Step S1206), ECU 1301 determines whether the received frame relates to a periodic communication frame (Step S1211). More specifically, ECU 1301 determines whether the received frame includes at least a part of the information included in the periodic communication frame (such as speed, steering angle, acceleration, and hydraulic pressure of brake).

If determining that the received frame relates to the periodic communication frame ("YES" in Step S1211), ECU 1301 updates the information included in the periodic communication frame and held in an internal memory (Step S1212), and returns to Step S1201.

If determining that the received frame is unrelated to the periodic communication frame ("NO" in Step S1211), ECU 1301 performs a process appropriate to the received frame. More specifically, ECU 1301 performs, for example, control over the connected device (Step S1213), and returns to Step S1201.

Figure 21:
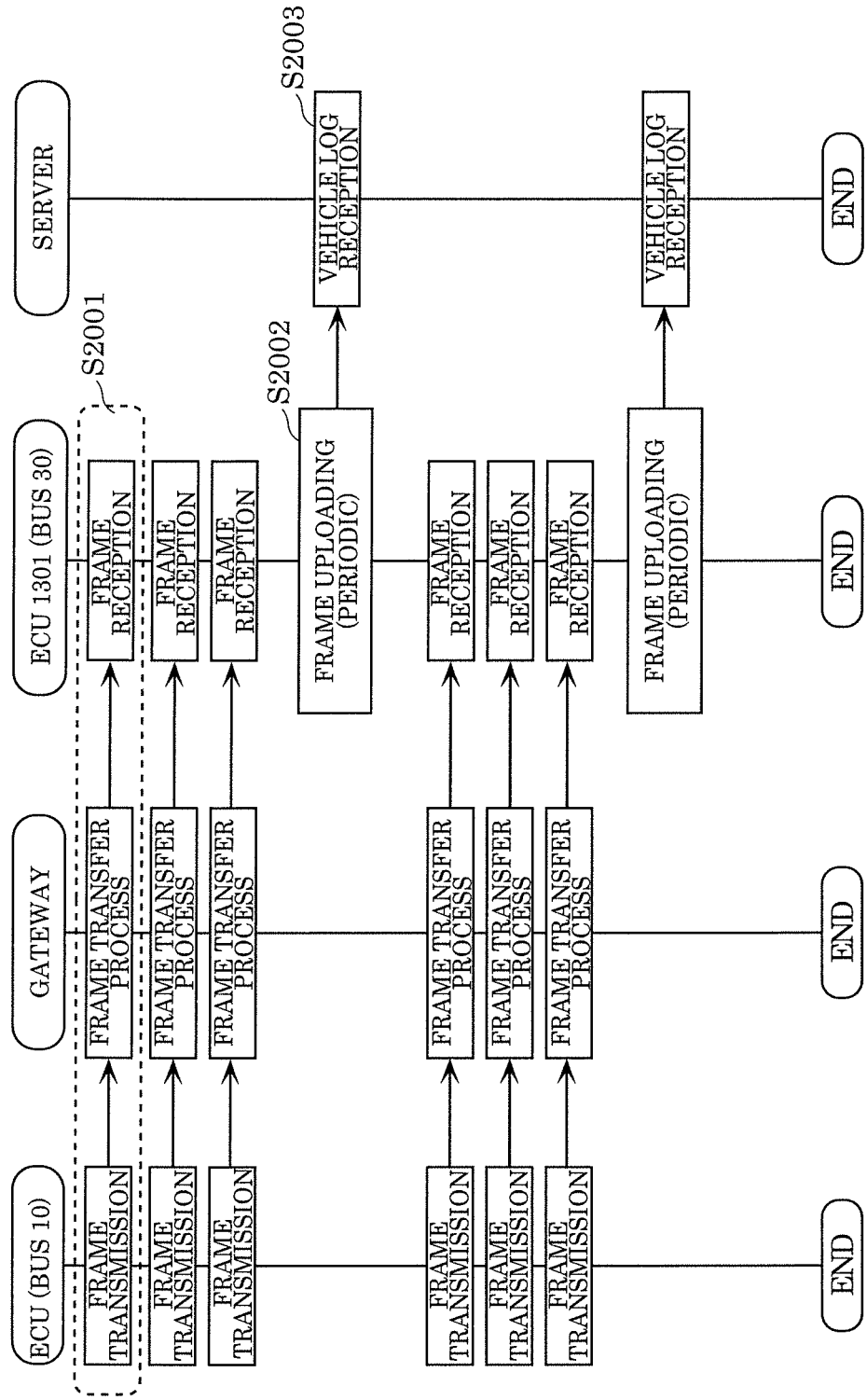
FIG. 21 is a processing sequence performed between a vehicle and a fraud detection server in a normal state, according to Embodiment 2.

2.10 Processing Sequence Performed Between Vehicle and Server in Normal State FIG. 21 is an example of a processing sequence performed between fraud detection server 80 and the vehicle in a normal state where no fraud frame is detected in the vehicle. FIG. 21 mainly illustrates, as an example, that one vehicle (vehicle 1010a) transmits, to fraud detection server 80, the log information including the information indicating the priority and the information about the frame received on the CAN bus of the in-vehicle network (i.e., the feature vectors obtained by processing the information about the frame), and that fraud detection server 80 analyzes the frame.

More specifically, FIG. 21 illustrates an example of an operation performed by gateway 1900 of a vehicle when receiving one frame, and an example of an operation performed by ECU 1301. In this example, vehicle 1010a transmits the log information to fraud detection server 80. However, the other vehicles (including vehicles 1010b, 1010c, 1010d, 1010e, and 1010f) also transmit the similar log information to fraud detection server 80. The following describes the exemplary operations with reference to FIG. 21.

An ECU connected to bus 10 transmits a frame, which is transferred by gateway 1900 to bus 30, and then ECU 1301 receives this frame. This sequence is indicated as Step S2001. Step S2001 is repeated.

ECU 1301 transmits the periodic communication frame and the priority (0) to fraud detection server 80 by reference to the internal timer (Step S2002).

Fraud detection server 80 receives the periodic communication frame as the vehicle log (Step S2003). Because the priority is "0", fraud detection server 80 simply stores the received vehicle log.

Figure 22:
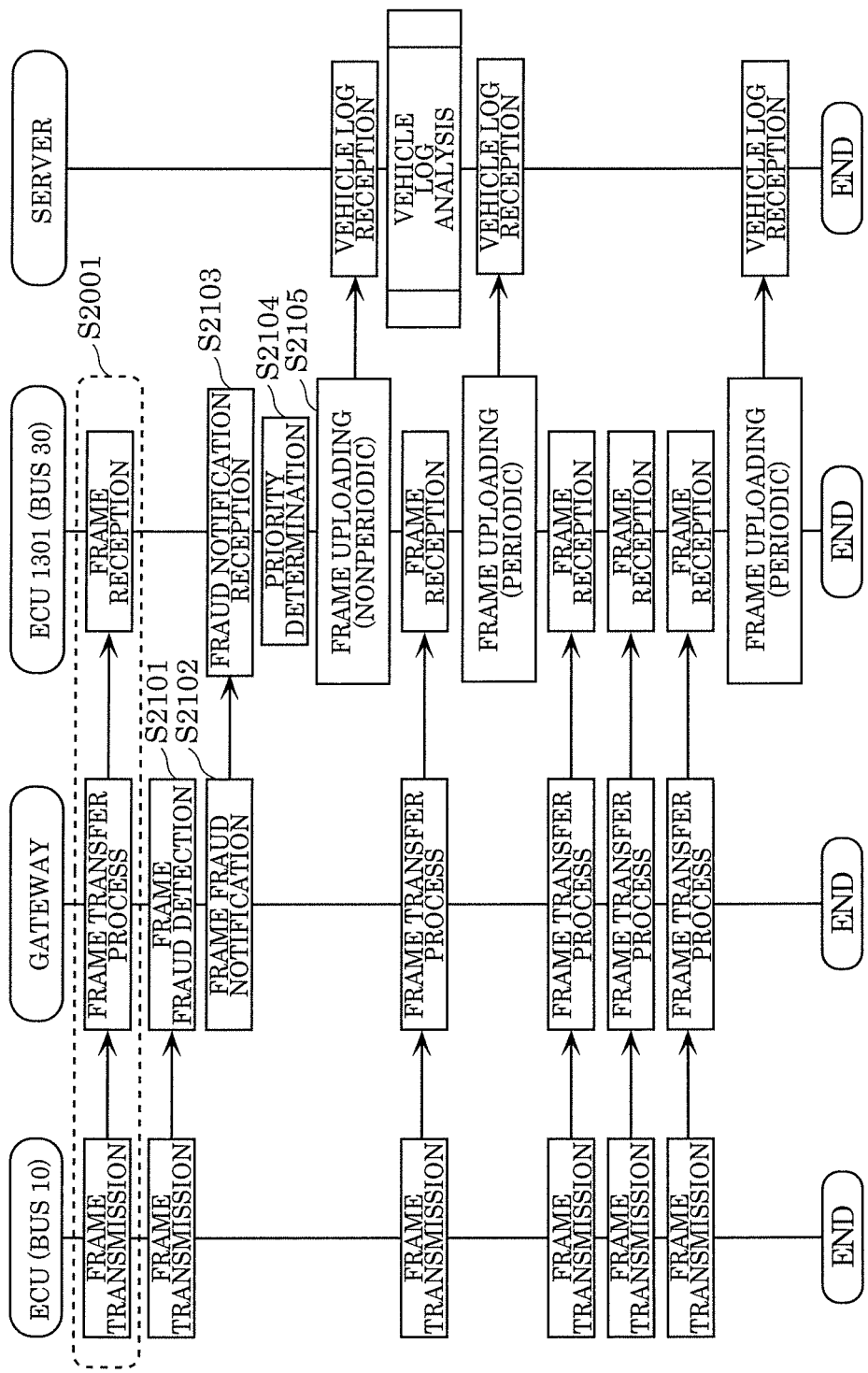
FIG. 22 illustrates a first example of a processing sequence performed between the vehicle and the fraud detection server when fraud is detected, according to Embodiment 2.

2.11 Processing Sequence 1 Performed Between Vehicle and Server in Fraud Detection FIG. 22 illustrates a first example of a processing sequence performed between fraud detection server 80 and the vehicle when a fraud frame is detected in the vehicle. The following describes the exemplary operations with reference to FIG. 22.

As in FIG. 21, ECU 1301 notifies fraud detection server 80 of the periodic communication frame. After this, gateway 1900 determines a frame as being a fraud frame, or more specifically, gateway 1900 detects that a frame is fraudulent (Step S2101).

If detecting the fraud frame, gateway 1900 transmits a fraud notification frame indicating that the frame is fraudulent (Step S2102).

ECU 1301 receives the fraud notification frame (Step S2103).

ECU 1301 determines the priority on the basis of the fraud notification frame (Step S2104).

ECU 1301 notifies fraud detection server 80 of the priority determined in Step S2104 together with the fraud notification frame (Step S2105).

Fraud detection server 80 analyzes the received vehicle log on the basis of the received priority.

Figure 23:
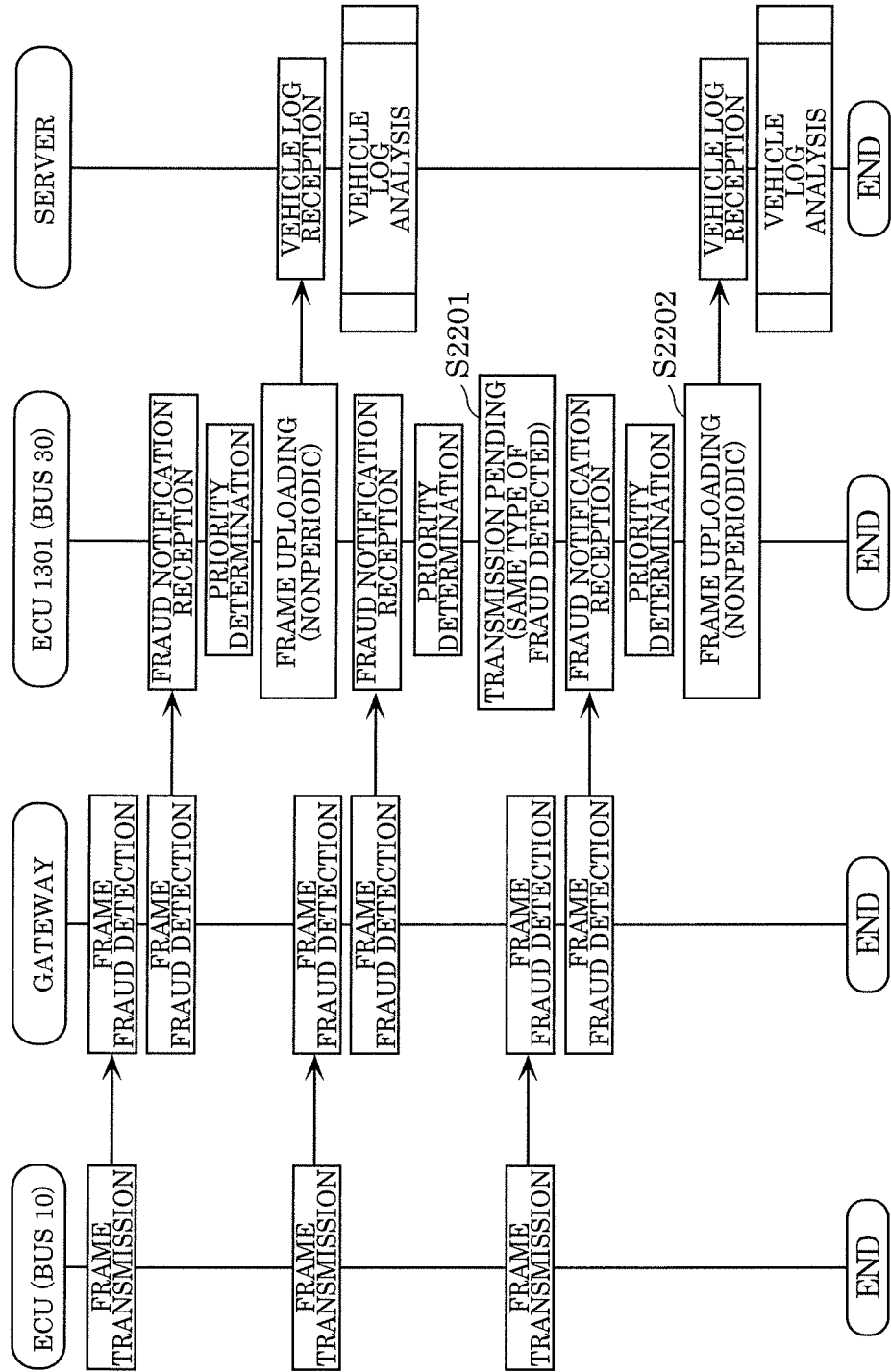
FIG. 23 illustrates a second example of the processing sequence performed between the vehicle and the fraud detection server when fraud is detected, according to Embodiment 2.

2.12 Processing Sequence 2 Performed Between Vehicle and Server in Fraud Detection FIG. 23 illustrates a second example of the processing sequence performed between fraud detection server 80 and the vehicle when a fraud frame is detected in the vehicle. The following describes the exemplary operations with reference to FIG. 23.

Processes performed by ECU 1301 to receive the fraud notification frame, determine the priority, and notify fraud detection server 80 are the same as those in FIG. 22.

Although ECU 1301 notifies fraud detection server 80 of the periodic communication frame as shown in FIG. 20, this process is omitted in FIG. 20.

When receiving the fraud notification frame for the second time, ECU 1301 refers to frame history holder 1370 to determine that this fraud notification frame is the same type as the previously-received fraud notification frame and thus does not notify fraud detection server 80 (Step S2201). After this, when receiving another fraud notification frame, ECU 1301 transmits the priority together with the information about the fraud notification frame to fraud detection server 80 (Step S2202).

Figure 24:
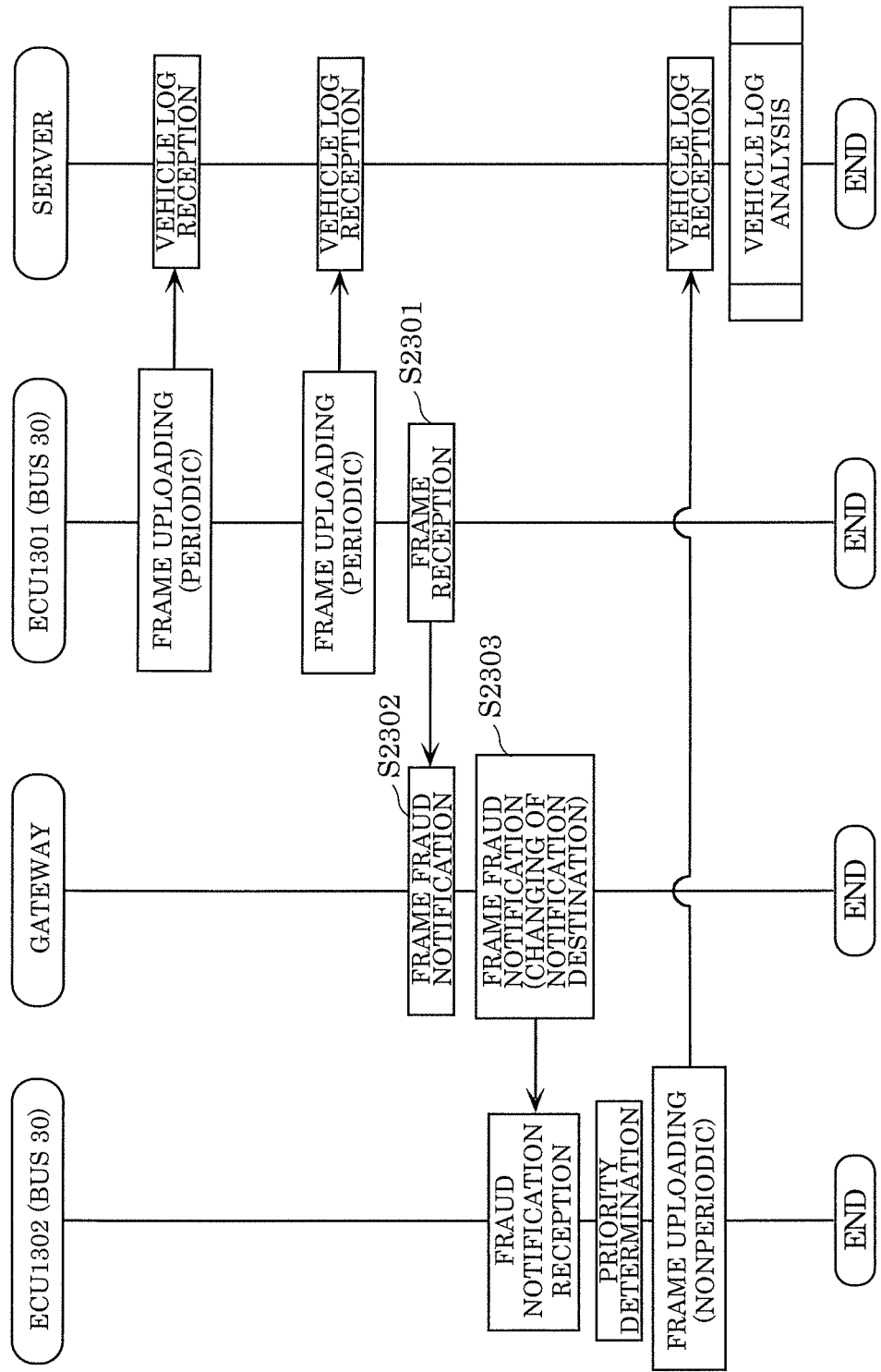
FIG. 24 illustrates a third example of the processing sequence performed between the vehicle and the fraud detection server when fraud is detected, according to Embodiment 2.

2.13 Processing Sequence 3 Performed Between Vehicle and Server in Fraud Detection FIG. 24 illustrates a third example of the processing sequence performed between fraud detection server 80 and the vehicle when a fraud is detected in the vehicle. The following describes the exemplary operations with reference to FIG. 24.

A process performed by ECU 1301 to notify fraud detection server 80 of the periodic communication frame is the same as that in FIG. 20.

ECU 1301 transmits the frame to bus 30 (Step S2301).

Gateway 1900 determines that this frame is fraudulent (Step S2302).

Gateway 1900 transmits the fraud notification frame. However, ECU 1301 may possibly perform a fraudulent operation. Thus, gateway 1900 changes the notification destination from ECU 1301 to ECU 1302 (Step S2303). More specifically, gateway 1900 transmits, to ECU 1302, the fraud notification frame having an ID different from an ID of the fraud notification frame to be transmitted to ECU 1301.

ECU 1302 receives the fraud notification frame, determines the priority, and then transmits the information about the fraud notification frame and the priority to fraud detection server 80. Fraud detection server 80 analyzes the received vehicle log according to the priority.

Advantageous Effects of Embodiment 2

In the in-vehicle network monitoring system according to Embodiment 2, the vehicle includes gateway 1900 that performs the fraud detection process, enabling the in-vehicle network to be monitored all the time. Thus, when fraud is detected, fraud detection server 80 is irregularly notified of the detected fraud frame. This leads to reductions in the communication traffic and in the processing load of fraud detection server 80.

Moreover, ECU 1302 does not notify fraud detection server 80 of the fraud frame of the same type as the fraud frame previously received on the in-vehicle network. This is effective in reducing the communication traffic and in the processing load of fraud detection server 80.

Furthermore, gateway 1900 changes the channel to notify fraud detection server 80 of the fraud frame, on the basis of the ID of the detected fraud frame. This allows gateway 1900 to notify fraud detection server 80 of the vehicle log by bypassing the device that may possibly perform a fraudulent operation on the channel used for transmitting the vehicle log. This can promise enhanced security of the in-vehicle network monitoring system.

Other Variations

Although the present disclosure has been described by way of Embodiments above, it should be obvious that the present disclosure is not limited to Embodiments described above. Variations described below are also included in the scope of the present disclosure.

(1) Although the in-vehicle network is described as a CAN in Embodiments above, this is not intended to be limiting. The in-vehicle network may be a CAN with flexible data rate (CAN-FD), an Ethernet network, a local interconnect network (LIN), or a Flexray network, or a combination of any of these.

(2) Although the abnormality detection processing by machine learning is performed by the cloud server in Embodiments above, this processing may be performed by a device included in the vehicle. For example, the processing may be performed by a graphics processing unit (GPU) of a head unit. This enables immediate detection. In this case, the cloud server may compile the results of abnormality detection performed locally by the vehicles. Here, the priority of the processing may be calculated in the head unit, or may be included in a CAN message and notified by another device, such as a gateway.

(3) Although the preprocessing for generating the feature vectors is performed on the local side in Embodiments above, the preprocessing may be performed by the cloud server.

(4) Although the abnormality detection processing is performed by the cloud server in Embodiments above, the processing may be performed at an edge server closer to the local environment. This reduces the effect caused by network delay processing more than when the abnormality detection processing is performed by the cloud server. Suppose that the edge server is a road-side device which is connected to the cloud server, for example. In this case, the vehicle may upload the in-vehicle message information to the road-side device, which may perform the abnormality detection processing and then upload the result of the detection to the cloud server.

Figure 25:
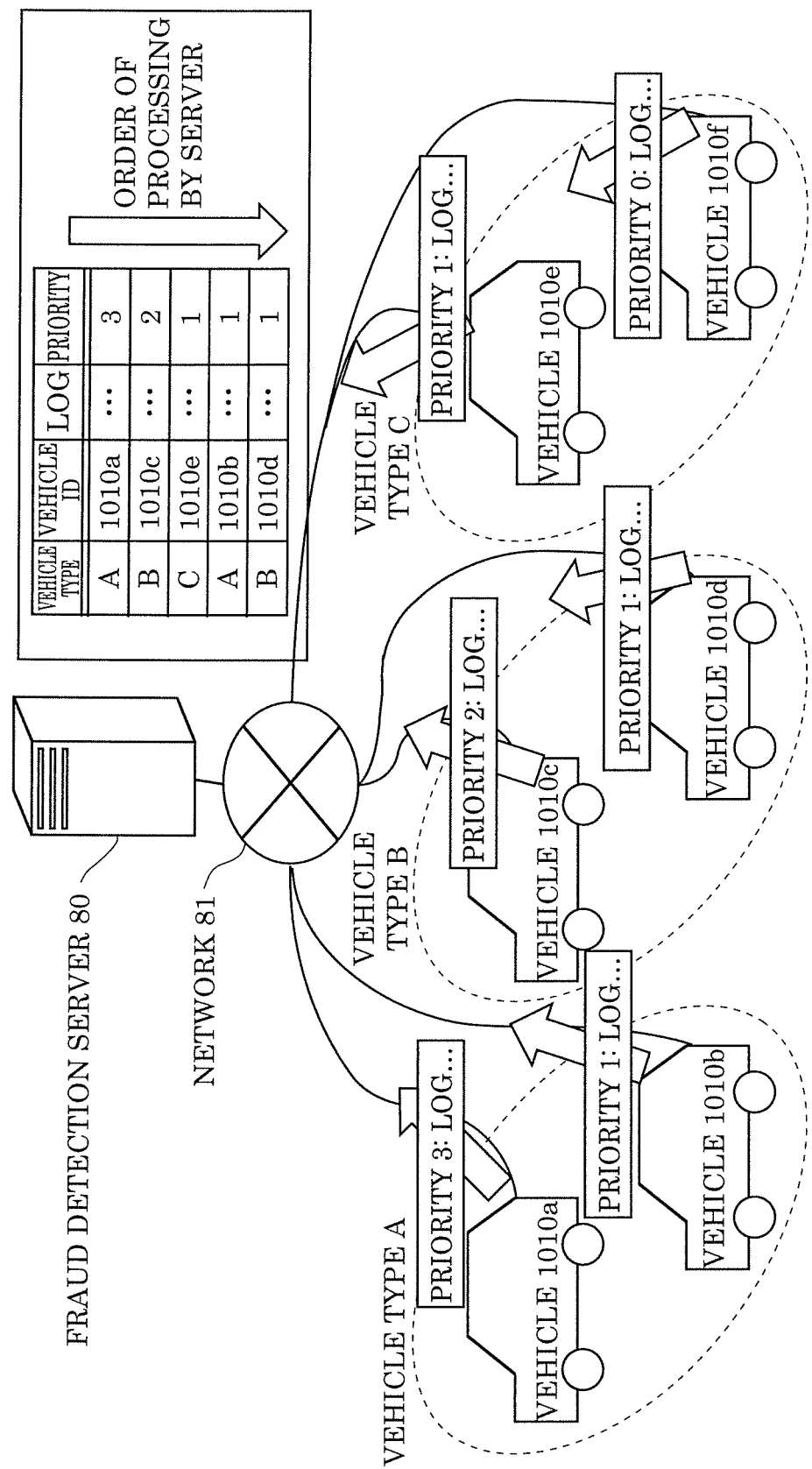
FIG. 25 illustrates an overview of an in-vehicle network monitoring system according to Variation (6) in Other Variations.

(5) When an abnormality is detected in the vehicle or in the cloud server, the alert is issued to the manager of the in-vehicle network monitoring system in Embodiments above. However, this is not intended to be limiting. The alert may be issued to the car manufacturer, an ECU supplier, or an information terminal owned by the user. Alternatively, the alert may be issued to a security provider commonly available to a plurality of car manufacturers (6) The fraud detection server allocates more computational resources of the server to the vehicle log analysis for the higher priority in Embodiments above. The fraud detection server may not only allocate more computational resources, but also perform the analysis in order of priority (see FIG. 25). This allows the fraud detection server, when performing single-thread processing, to perform the analysis in order of priority. Thus, this is effective in achieving immediate fraud detection and handling.

Figure 26:
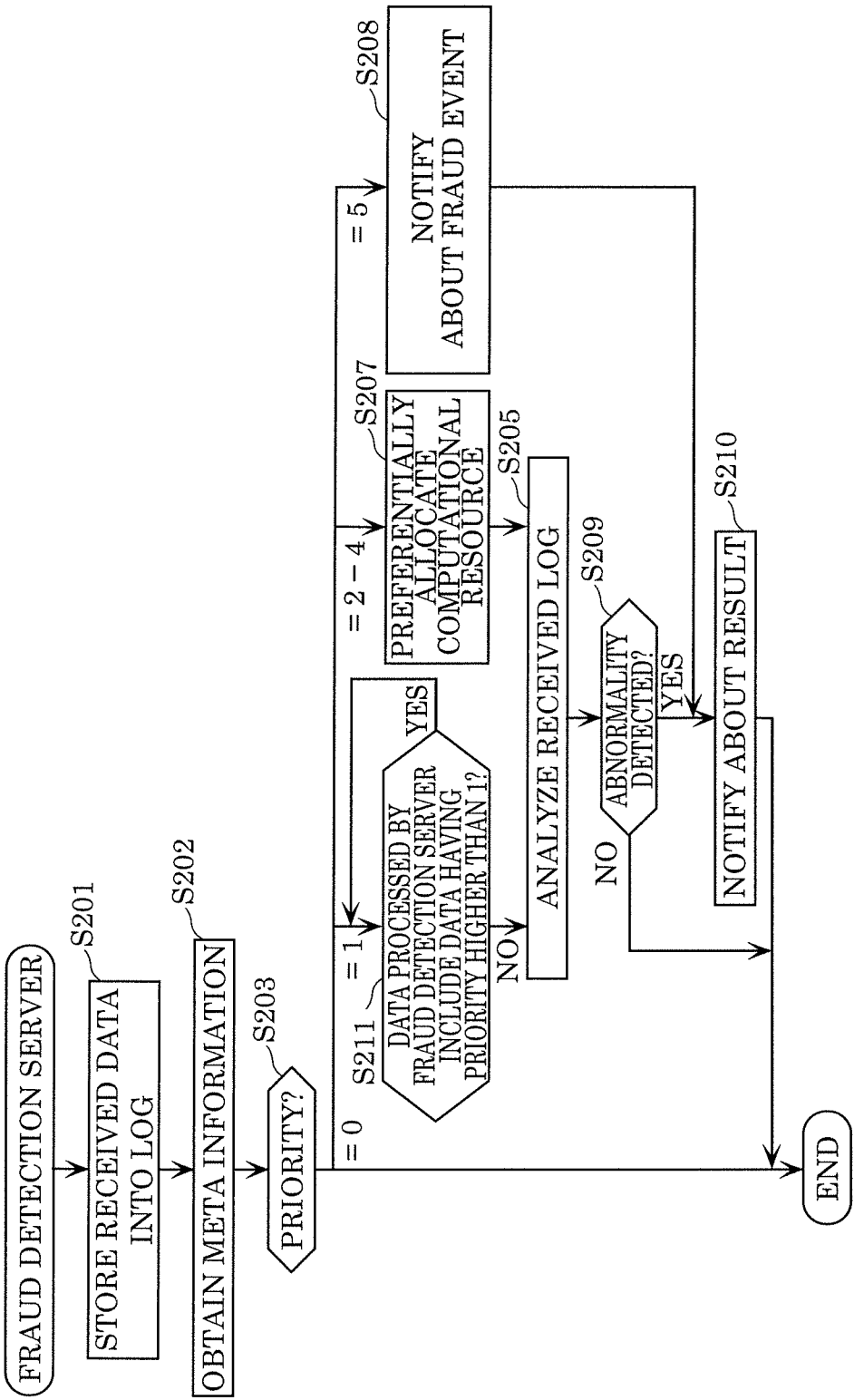
FIG. 26 is a flowchart of processing performed by a fraud detection server according to Variation (7) in Other Variations.
Figure 27:
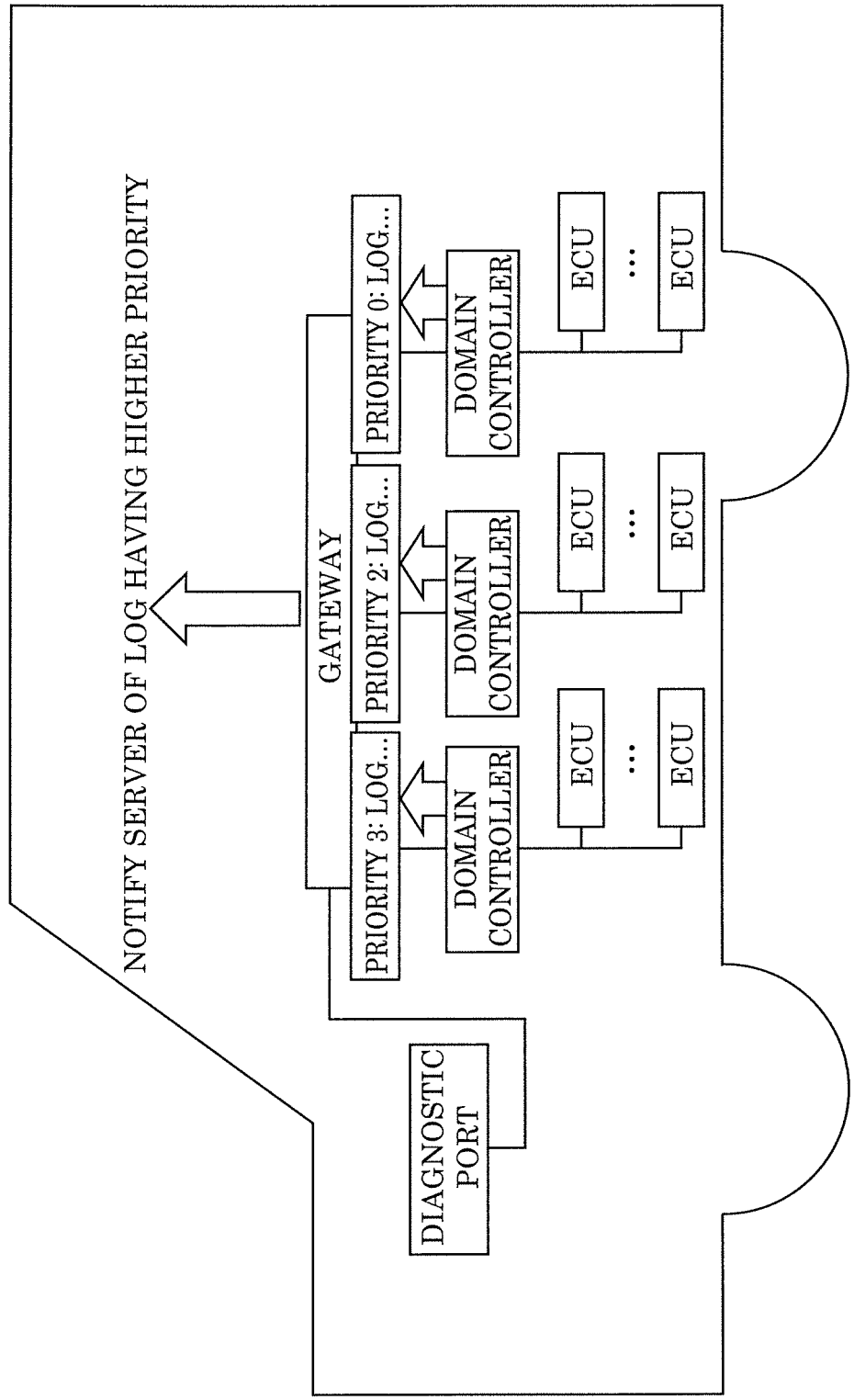
FIG. 27 illustrates an overview of an in-vehicle network system according to Variation (8) in Other Variations.

(7) For the highest priority, the vehicle log is analyzed after the notification is immediately provided to the manager of the in-vehicle network monitoring system in Embodiments above. However, the vehicle log may not be analyzed (see FIG. 26). Thus, the manager can be immediately notified of an obviously fraudulent event, and the analytical processing can be skipped. This is effective in reducing the processing load of the server.

(8) Although the ECU communicating with the fraud detection server includes the priority determiner in Embodiment 2 above, the priority determiner may be included in the gateway. An in-vehicle network architecture illustrated in FIG. 26 may include a priority determiner in each of domain controllers. On the basis of the priorities and logs received from the domain controllers, the gateway may notify the fraud detection server of the logs in order of priority, recalculate the priorities, or notify the fraud detection server of the logs having the same priority at a time.

(9) The fraud detection server and the server communicator are separately provided in Embodiment 2 above, these two may be included in the same device. For example, the server communicator may be included in the gateway, and a fraud detection processor may be included in an ECU.

(10) To change the notification destination of the fraud notification frame, the fraud notification frame having a different CAN ID is transmitted to the same bus in Embodiment 2 above. The method for changing the notification destination is not limited to this. For example, the notification destination may be designated in the data field without changing the CAN ID. Alternatively, the fraud notification frame may be transmitted to a different bus, instead of the same bus. This enables the fraud notification frame to be transmitted without involving the bus having a serious abnormality, and is thus effective in enhancing the security.

(11) Although the fraud detection server is notified of the log always together with the priority in Embodiments above, the priority may not be always notified. For example, the periodic communication frame may not include the priority in Embodiment 2.

(12) Although the range of the values representing the priority is from 0 to 5 in Embodiments above, this is not intended to be limiting. For example, the priority may be represented by a score ranging from 0 to 100. This is effective because the fraud detection server can perform more detailed determination of the priority. For the priority lower than a first predetermined threshold, the server may only store the log. For the priority higher than or equal to the first threshold but lower than a second threshold, the server may analyze the vehicle logs in order of priority. For the priority higher than or equal to the second threshold, the server may notify the manager of the in-vehicle network monitoring system.

(13) The priority based on the current state of the vehicle and the priority of the fraud frame are described separately in Embodiments 1 and 2 above. However, these priorities may be handled at the same time. In this case, the fraud detection server may be notified of the priority based on the state of the vehicle and the priority of the fraud frame separately. Alternatively, one priority may be calculated according to a new priority rule for combining these two priorities. Thus, the priority can be calculated by a multi-perspective approach. This is effective in enabling the fraud detection server to preferentially process a high-risk fraudulent event.

(14) When the fraud notification frame of the same type as before is received, the fraud detection server is not notified of this frame in Embodiment 2 above. However, a condition under which the fraud detection server is not notified about the frame is not limited to this. For example, a threshold may be predetermined for the available communication volume for notification per unit of time. When the communication volume for the frame exceeds the threshold, the fraud detection server may not be notified about the frame.

(15) Although the fraud detection server is notified about the vehicle log at any priority level in Embodiments above, the notification to the fraud detection server may be omitted depending on the priority. For example, when the priority is a predetermined threshold or lower, the fraud detection server may not be notified about the vehicle log. Moreover, the fraud detection server may designate the predetermined threshold. Thus, the upload of vehicle logs from the vehicle can be restricted depending on the current processing load of the fraud detection server. This is effective in reducing the communication traffic and the processing load of the fraud detection server.

(16) Although the fraud detection server is immediately notified of the frame having a high priority in Embodiments above, the vehicle log does not need to be transmitted immediately. For example, only when a predetermined number of high-priority frames of the same kind are detected in a predetermined period, the fraud detection server may be notified of information about the frames. Alternatively, the priorities may be accumulated for a predetermined period. When a value representing the accumulated priorities exceeds a predetermined threshold, the fraud detection server may be notified. This is effective in reducing the communication traffic and the processing load of the fraud detection server.

(17) The fraud detection server is not always notified of the frame determined as being fraudulent in Embodiment 2 above. Additionally, a frame having the same CAN ID as the frame determined as being fraudulent may be stored for a predetermined period. This is useful for future reference of the reception history of the frame having the same CAN ID as the frame determined as being fraudulent, in response to a request from the server. Thus, information effective in analyzing the frame can be obtained.

(18) Although the vehicle log transmitted to the fraud detection server is information related to the CAN frame in Embodiments above, the vehicle log transmitted to the fraud detection server is not limited to this. For example, the information may be an Ethernet frame, a CAN-FD frame, and a FlexRay frame, and may not be an in-vehicle network frame. Alternatively, the information may be GPS information indicating the current location of the vehicle, a log to access the audio head unit, a log related to an operation process, or version information of firmware.

(19) More specifically, each of the devices in Embodiments above may be a computer system configured with, for example, a microprocessor, a ROM, a RAM, a hard disk unit, a display unit, a keyboard, and a mouse. The RAM or the hard disk unit stores a computer program. The microprocessor operates according to the computer program, so that each function of the devices is achieved. Here, the computer program includes a plurality of instruction codes indicating instructions to be given to the computer so as to achieve a specific function.

(20) Some or all of the structural components included in each of the devices in Embodiments above may be realized as a single system large scale integration (LSI). The system LSI is a super multifunctional LSI manufactured by integrating a plurality of structural components onto a signal chip. To be more specific, the system LSI is a computer system configured with a microprocessor, a ROM, and a RAM, for example. The RAM stores a computer program. The microprocessor operates according to the computer program, so that a function of the system LSI is achieved.

The structural components in each of the devices in Embodiments above may be implemented by individual chips. Alternatively, some or all of the components may be implemented by a single chip.

Although the integrated circuit implementing these structural components is referred to as the system LSI here, the integrated circuit may be referred to as an IC, an LSI, a super LSI, or an ultra LSI depending on the scale of integration.

Moreover, a method of implementation of the structural components using an integrated circuit is not limited to application of an LSI. The components may be implemented by a dedicated circuit or a general-purpose processor. It is also possible to use a field programmable gate array (FPGA) that can be programmed after being manufactured, or a reconfigurable processor in which connection and setting of circuit cells in an LSI can be reconfigured.

Furthermore, when a circuit integration technology that replaces LSIs comes along owing to advances of the semiconductor technology or to a separate derivative technology, the function blocks should be understandably integrated using that technology. There can be a possibility of adaptation of biotechnology, for example.

(21) Some or all of the components included in each of the devices described above may be implemented as an IC card or a standalone module that can be inserted into and removed from the corresponding device. The IC card or the module is a computer system configured with a microprocessor, a ROM, and a RAM, for example. The IC card or the module may include the aforementioned super multifunctional LSI. The microprocessor operates according to the computer program, so that a function of the IC card or the module is achieved. The IC card or the module may be tamper-resistant.

(22) The present disclosure may be the methods described above. Each of the methods may be a computer program causing a computer to execute the steps included in the method. Moreover, the present disclosure may be a digital signal of the computer program.

Moreover, the present disclosure may be the aforementioned computer program or digital signal recorded on a computer-readable recording medium, such as a flexible disk, a hard disk, a CD-ROM, an MO, a DVD, a DVD-ROM, a DVD-RAM, a Blu-ray (registered trademark) disc (BD), or a semiconductor memory. The present disclosure may also be the digital signal recorded on such a recording medium.

Furthermore, the present disclosure may be the aforementioned computer program or digital signal transmitted via a telecommunication line, a wireless or wired communication line, a network represented by the Internet, and data broadcasting.

Moreover, the present disclosure may be a computer system including a microprocessor and a memory. The memory may store the aforementioned computer program and the microprocessor may operate according to the computer program.

Furthermore, by transferring the recording medium having the aforementioned program or digital signal recorded thereon or by transferring the aforementioned program or digital signal via the aforementioned network or the like, the present disclosure may be implemented by a different independent computer system.

(23) Embodiments and variations described above may be combined.

Each of the structural components in each of Embodiments above may be configured in the form of an exclusive hardware product, or may be realized by executing a software program suitable for the structural component. Each of the structural components may be realized by means of a program executor, such as a CPU and a processor, reading and executing the software program recorded on a recording medium such as a hard disk or a semiconductor memory. Here, the software program for implementing the in-vehicle network monitoring system according to Embodiments is a program described below.

Specifically, the program causes a computer to execute an in-vehicle network monitoring method of monitoring an in-vehicle network included in a vehicle, which includes: determining a priority using at least one of: a state of the vehicle including an in-vehicle network system; an identifier of a message communicated on the in-vehicle network; and a result of fraud detection performed on the message; transmitting and receiving the message communicated on the in-vehicle network; extracting information about the in-vehicle network based on the message received in the transmitting and receiving; notifying notification information including the priority and the information about the in-vehicle network; receiving notification information including the priority and information about the in-vehicle network system from at least one vehicle; and analyzing whether fraud occurs to the in-vehicle network system, based on the information about the in-vehicle network system, wherein when the priority included in the notification information is higher, the information about the in-vehicle network system included in the notification information is more preferentially analyzed in the analyzing.

Although the electronic control device according to the present disclosure in an aspect or aspects has been described by way of Embodiments above, it should be obvious that the present disclosure is not limited to Embodiments described above. Other embodiments implemented through various changes and modifications conceived by a person of ordinary skill in the art or through a combination of the components in different embodiments described above may be included in the scope in an aspect or aspects according to the present disclosure, unless such changes, modifications, and combination depart from the scope of the present disclosure.

INDUSTRIAL APPLICABILITY

The present disclosure is applicable to an in-vehicle electronic control device and a fraud detection server that detects fraud on an in-vehicle network.

What is claimed is:

1. An electronic control device that notifies a fraud detection server located outside a vehicle of information about an in-vehicle network system including an in-vehicle network, the electronic control device comprising:
a first communicator;
a second communicator;
a processor; and
a memory including at least one set of instructions that, when executed by the processor causes the processor to perform operations including:
receiving, by the first communicator, a message from the in-vehicle network;
determining, based on the message received by the first communicator, a priority using a result of fraud detection performed on the message received by the first communicator;
extracting information about the in-vehicle network based on the message received by the first communicator; and
notifying the fraud detection server of notification information including the priority and the information about the in-vehicle network, by the second communicator.

2. The electronic control device according to claim 1, wherein in the determining of the priority, the priority is determined using the result of fraud detection performed on the message received by the first communicator and a state of the vehicle included in the message, and the state of the vehicle is information calculated based on the message received by the first communicator and includes at least one of: a speed of the vehicle; acceleration of the vehicle; a steering angle of the vehicle; an operating condition of a driver assistance function of the vehicle; or a bandwidth occupancy rate of the in-vehicle network.

3. The electronic control device according to claim 1, wherein in the determining of the priority, the priority is determined using the result of fraud detection performed on the message received by the first communicator and an identifier of the message received by the first communicator, and wherein in the determining the priority, the priority is determined to be higher when a type of the message determined by the identifier of the message received by the first communicator indicates one of: a control message related to the driver assistance function or a self-driving function; a message related to firmware-updating of the electronic control device included in the vehicle; a message related to a notification about a running state of the vehicle; or a diagnostic message of the vehicle.

4. The electronic control device according to claim 1, wherein in the determining of the priority, the priority is determined using the result of fraud detection performed on the message received by the first communicator, the result of the fraud detection includes a result of verification performed on a message authentication code included in the message received by the first communicator, and in the determining of the priority, the priority is determined to be higher when the result of the verification performed on the message authentication code is negative.

5. The electronic control device according to claim 1, wherein the operations further include:

detecting fraud in the message received by the first communicator, and wherein the result of the fraud detection performed on the message is information indicating whether the fraud in the message is detected in the detecting, and in the determining the priority, the priority is determined to be higher when the result of the fraud detection indicates the fraud is detected in the message.

6. The electronic control device according to claim 1, wherein in the determining of the priority, the priority is determined using the result of fraud detection performed on the message received by the first communicator and an identifier of the message received by the first communicator, wherein the notification information includes the identifier of the message related to the information about the in-vehicle network that is included in the notification information, and the second communicator holds past notification information previously transmitted to the fraud detection server, and before transmitting new notification information to the fraud detection server, disables transmission of the new notification information to the fraud detection server when the past notification information matches with a predetermined part of: the identifier of the message related to the information about the in-vehicle network that is included in the new notification information; the result of the fraud detection performed on the message included in the new notification information; and the priority included in the new notification information.

7. The electronic control device according to claim 1, wherein when the priority is a first predetermined value or lower, the second communicator performs one of: a process of disabling transmission of the notification information to the fraud detection server; and a process of transmitting the notification information to the fraud detection server at a first timing having predetermined communication intervals, and when the priority is a second predetermined value or higher, the second communicator transmits the notification information to the fraud detection server at a second timing different from the first timing.

8. A fraud detection server that receives notification information including information about an in-vehicle network system including an in-vehicle network from at least one vehicle, the fraud detection server comprising:
a third communicator that receives, from the at least one vehicle, notification information including a priority of a message communicated on the in-vehicle network and the information about the in-vehicle network system, the information about the in-vehicle network system including information about the message communicated on the in-vehicle network;
a processor; and
a memory including at least one set of instructions that, when executed by the processor causes the processor to perform operations including:
analyzing whether fraud occurs to the in-vehicle network system, based on the information about the in-vehicle network system,
wherein in the analyzing, when the priority included in the notification information is a first predetermined value or higher, the information about the in-vehicle network system included in the notification information is analyzed in a first manner, and
in the analyzing, when the priority included in the notification information is a second predetermined value or lower, the information about the in-vehicle network system included in the notification information is analyzed in a second manner, the second manner being different than the first manner.

9. The fraud detection server according to claim 8, wherein in the analyzing,
when the priority included in the notification information is the first predetermined value or higher: analysis of information about the in-vehicle network is brought forward,
more computational resources are allocated for the analysis of the information about the in-vehicle network, or
the analysis of the information about the in-vehicle network is determined to be performed in a predetermined manner when determining whether the analysis is to be performed.

10. The fraud detection server according to claim 9, wherein the operations further include:
handling fraud occurring to the in-vehicle network,
wherein, in the analyzing, when the priority is the second predetermined value or lower, the analysis of the information about the in-vehicle network is disabled, and
in the handling, when the priority is a third predetermined value or higher, the fraud occurring to the in-vehicle network is handled.

11. The fraud detection server according to claim 10, wherein in the handling, at least one of the following is performed to handle the fraud occurring to the in-vehicle network of a vehicle among the at least one vehicle:
(a) notifying a manager present outside the fraud detection server about occurrence of the fraud;
(b) transmitting, to the vehicle, a control signal to disable a driver assistance function and a self-driving function;
(c) updating encryption key information included in the vehicle;
(d) notifying the vehicle about a shift to a functional safety mode;
(e) notifying the vehicle about a shift to a remote control mode;
(f) making a voice call to an operator present outside the vehicle;
(g) forcefully terminating an information-related system included in the vehicle; and
(h) updating firmware of an electronic control device included in the vehicle.

12. The fraud detection server according to claim 8, wherein the operations further include:
setting a lower limit of the priority of the notification information transmitted from the at least one vehicle to the fraud detection server,
wherein in the setting, a processing load of the fraud detection server is measured, and
in the setting, when the processing load of the fraud detection server that is measured is a predetermined value or higher, the lower limit of the priority is raised and the at least one vehicle is notified of the raised lower limit.

13. An in-vehicle network system that notifies a fraud detection server located outside a vehicle of notification information including information about the in-vehicle network system including an in-vehicle network, the in-vehicle network system comprising:
a first electronic control device; and
a second electronic control device,
wherein the first electronic control device includes:
a first processor; and
a first memory including at least one set of instructions that, when executed by the first processor causes the first processor to perform operations including:
detecting fraud in a message communicated on the in-vehicle network; and
notifying the second electronic control device of a result of fraud detection performed on the message by the fraud detector, and
the second electronic control device includes:
a fourth communicator
a fifth communicator,
a second processor; and
a second memory including at least one set of instructions that, when executed by the second processor causes the second processor to perform operations including:
receiving, by the fourth communicator, the message from the in-vehicle network;
determining, based on the message received by the fourth communicator, a priority using the result of the fraud detection performed on the message received by the fourth communicator;
extracting information about the in-vehicle network based on the message received by the fourth communicator;

receiving the result of the fraud detection performed on the message from the first electronic control device; and notifying the fraud detection server of notification information including the priority and the information about the in-vehicle network, by the fifth communicator.

14. The in-vehicle network system according to claim 13, further comprising:
a third electronic control device,
wherein the third electronic control device includes:
a sixth communicator;
a seventh communicator;
a third processor; and
a third memory including at least one set of instructions that, when executed by the third processor causes the third processor to perform operations including:
receiving, by the sixth communicator, a message from the in-vehicle network;
determining, based on the message received by the sixth communicator, the priority using the result of the fraud detection performed on the message received by the sixth communicator;
extracting the information about the in-vehicle network based on the message received by the sixth communicator;
receiving the result of the fraud detection performed on the message from the first electronic control device; and
notifying the fraud detection server of the notification information including the priority and the information about the in-vehicle network, by the seventh communicator, and
in the notifying by the first electronic control device, the third electronic control device is notified of the result of the fraud detection when an identifier of a detected fraudulent message is the identifier of the message transmitted from the first electronic control device.

15. An in-vehicle network monitoring system that monitors an in-vehicle network included in a vehicle, the in-vehicle network monitoring system comprising:
an electronic control device that notifies a fraud detection server located outside the vehicle of information about an in-vehicle network system including the in-vehicle network; and
the fraud detection server,
wherein the electronic control device includes:
a first communicator;
a second communicator;
a first processor; and
a first memory including at least one set of instructions that, when executed by the first processor causes the first processor to perform operations including:
receiving, by the first communicator, a message from the in-vehicle network;
determining, based on the message received by the first communicator; a priority using at least one of: a state of the vehicle included in the message; an identifier of the message received by the first communicator; and a result of fraud detection performed on the message received by the first communicator;
extracting information about the in-vehicle network based on the message received by the first communicator; and notifying the fraud detection server of notification information including the priority and the information about the in-vehicle network, by the second communicator,
the fraud detection server includes:
a third communicator;
a second processor; and
a second memory including at least one set of instructions that, when executed by the second processor causes the second processor to perform operations including:
receiving notification information including the priority and the information about the in-vehicle network system from at least one vehicle, by the third communicator; and
analyzing whether fraud occurs to the in-vehicle network system, based on the information about the in-vehicle network system,
wherein in the analyzing, when the priority included in the notification information is a first predetermined value or higher, the information about the in-vehicle network system included in the notification information is analyzed in a first manner, and
in the analyzing, when the priority included in the notification information is a second predetermined value or lower, the information about the in-vehicle network system included in the notification information is analyzed in a second manner, the second manner being different than the first manner.

16. An in-vehicle network monitoring method of monitoring an in-vehicle network included in a vehicle, the in-vehicle network monitoring method being used in an in-vehicle network system and comprising:
receiving a message from the in-vehicle network;
determining, based on the message received from the in-vehicle network, a priority using at least one of: a state of the vehicle included in the message; an identifier of the message received from the in-vehicle network; and a result of fraud detection performed on the message received from the in-vehicle network;
extracting information about the in-vehicle network based on the message received from the in-vehicle network;
notifying notification information including the priority and the information about the in-vehicle network;
receiving notification information including the priority and information about the in-vehicle network system from at least one vehicle; and
analyzing whether fraud occurs to the in-vehicle network system, based on the information about the in-vehicle network system,
wherein in the analyzing, when the priority included in the notification information is a first predetermined value or higher, the information about the in-vehicle network system included in the notification information is analyzed in a first manner, and
in the analyzing, when the priority included in the notification information is a second predetermined value or lower, the information about the in-vehicle network system included in the notification information is analyzed in a second manner, the second manner being different than the first manner.

* * * * *